(12) United States Patent
Tani et al.

(10) Patent No.: US 9,118,847 B2
(45) Date of Patent: Aug. 25, 2015

(54) DUSTPROOF STRUCTURE OF IMAGE GENERATION DEVICE, AND PROJECTION DISPLAY DEVICE

(75) Inventors: Yusuke Tani, Tokyo (JP); Takayuki Okada, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 930 days.

(21) Appl. No.: 13/138,680

(22) PCT Filed: Mar. 24, 2009

(86) PCT No.: PCT/JP2009/055824
§ 371 (c)(1),
(2), (4) Date: Sep. 19, 2011

(87) PCT Pub. No.: WO2010/109595
PCT Pub. Date: Sep. 30, 2010

(65) Prior Publication Data
US 2012/0008100 A1 Jan. 12, 2012

(51) Int. Cl.
*G03B 21/16* (2006.01)
*H04N 9/31* (2006.01)
*G02F 1/1333* (2006.01)

(52) U.S. Cl.
CPC ........ *H04N 9/3144* (2013.01); *G02F 1/133385* (2013.01); *H04N 9/3105* (2013.01); *G02F 1/133308* (2013.01); *G02F 2001/133311* (2013.01); *G02F 2201/36* (2013.01)

(58) Field of Classification Search
CPC ......... G03B 21/18; G03B 21/26; G03B 21/14
USPC ....................................................... 353/51–67
See application file for complete search history.

(56) References Cited

U.S. PATENT DOCUMENTS

| 4,610,706 A * | 9/1986 | Nesher ............................ 55/497 |
| 6,007,205 A | 12/1999 | Fujimori |
| 2002/0051120 A1* | 5/2002 | Barrau et al. ................... 353/31 |
| 2005/0213049 A1 | 9/2005 | Hamada et al. |
| 2007/0182935 A1 | 8/2007 | Miura |
| 2007/0195282 A1 | 8/2007 | Takasuka |
| 2009/0183476 A1* | 7/2009 | Dobashi et al. ................. 55/487 |

FOREIGN PATENT DOCUMENTS

| JP | 2001-209126 A | 8/2001 |
| JP | 2001-228803 A | 8/2001 |

(Continued)

OTHER PUBLICATIONS

International Search Report dated May 12, 2009 (English Translation Thereof).

*Primary Examiner* — William C Dowling
*Assistant Examiner* — Jerry Brooks
(74) *Attorney, Agent, or Firm* — McGinn IP Law Group, PLLC

(57) ABSTRACT

The present invention includes: LCDs (47, 48, 49) corresponding to red, green, and blue, respectively; an air duct for red, an air duct for green, and an air duct for blue provided to blow cooling air to the LCDs (47, 48, 49), respectively; air filters (43, 50) provided in each of the air duct for red, the air duct for green, and the air duct for blue; and air filters (41, 42) provided in at least one air duct of the air duct for green and the air duct for blue and having filter mesh size smaller than that of the air filters (43, 50).

7 Claims, 23 Drawing Sheets

(56) References Cited

FOREIGN PATENT DOCUMENTS

| | | |
|---|---|---|
| JP | 2002-174855 A | 6/2002 |
| JP | 2003-234982 A | 8/2003 |
| JP | 2003-241310 A | 8/2003 |
| JP | 2004-157347 A | 6/2004 |
| JP | 2005-274731 A | 10/2005 |
| JP | 2006-330380 A | 12/2006 |
| JP | 2007-212568 A | 8/2007 |
| JP | 2007-256899 A | 10/2007 |
| JP | 2007-292805 A | 11/2007 |

\* cited by examiner

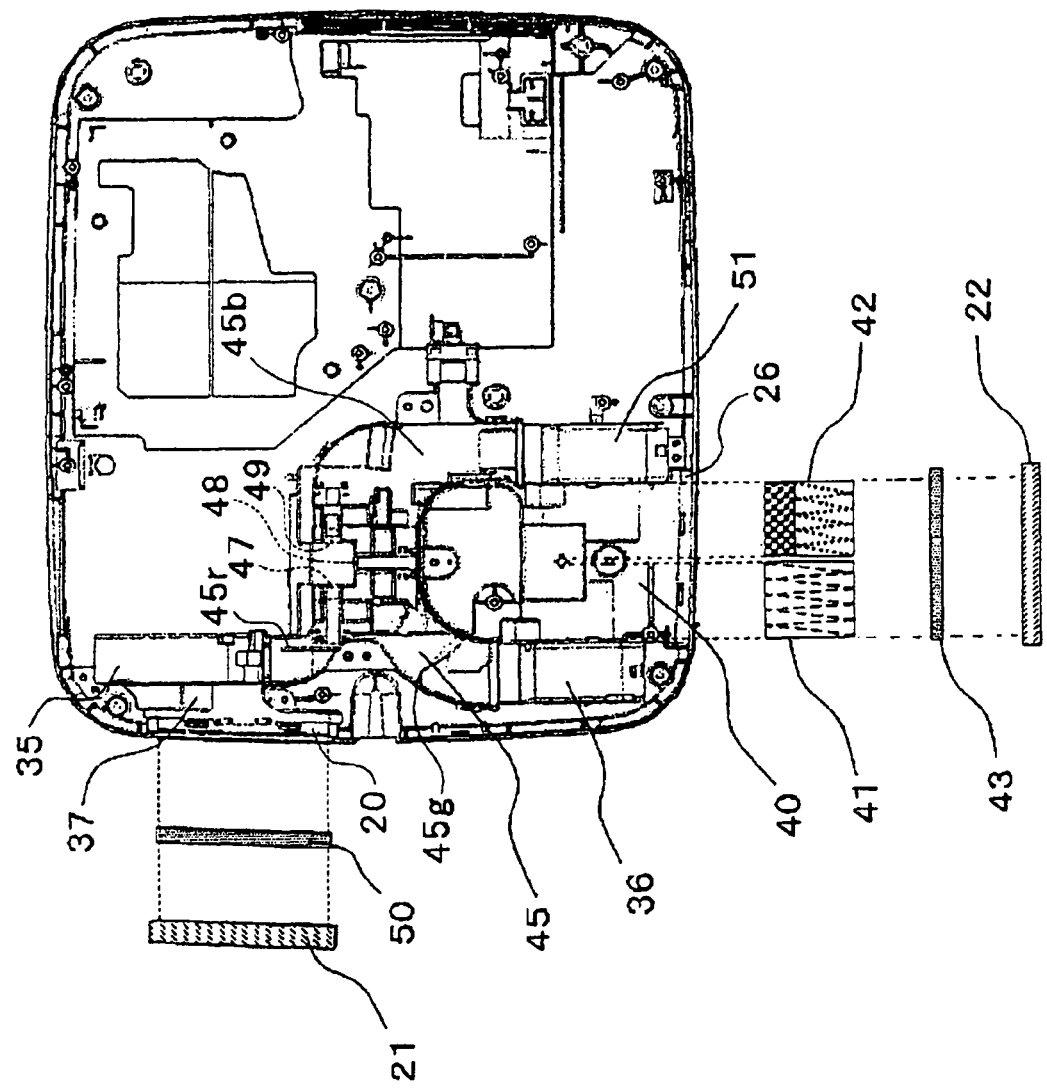

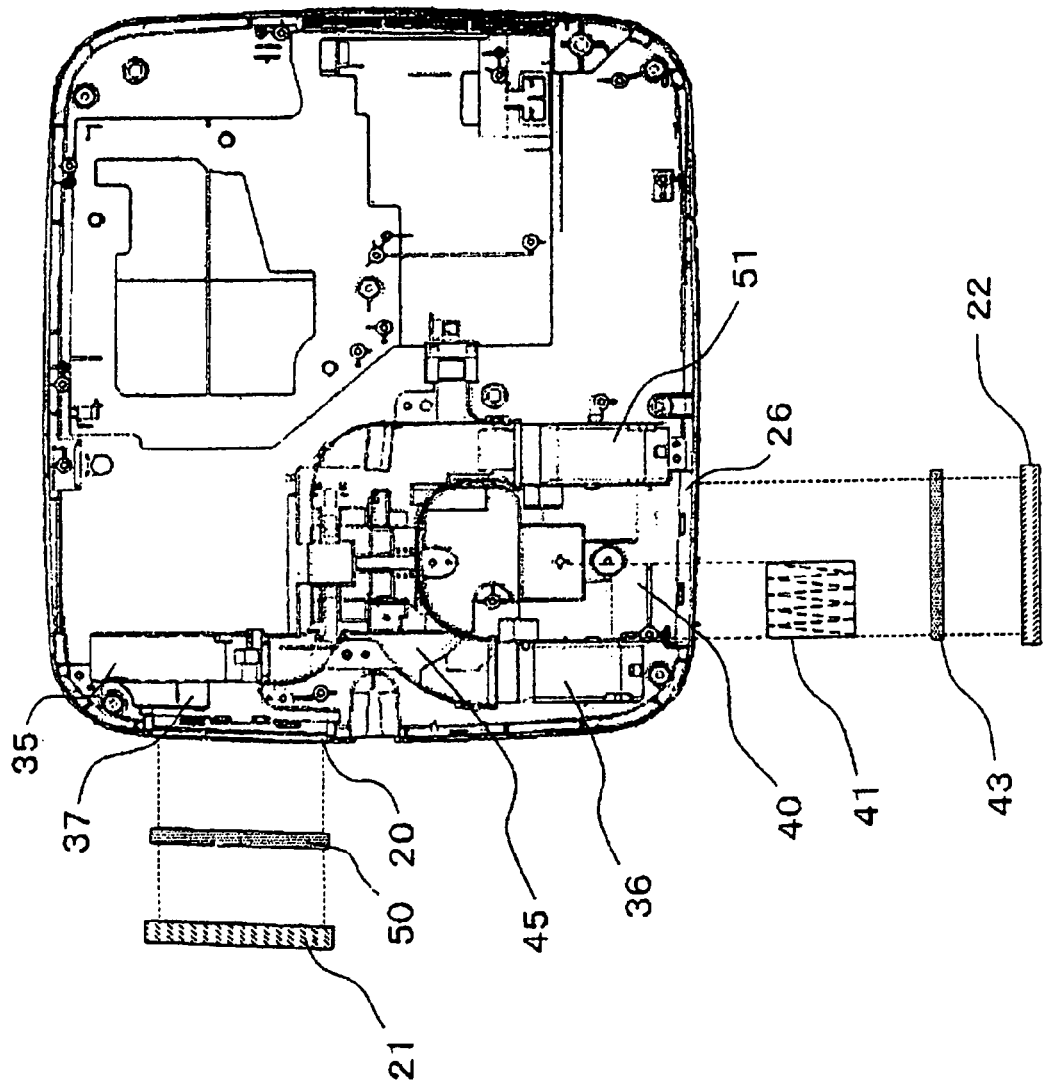

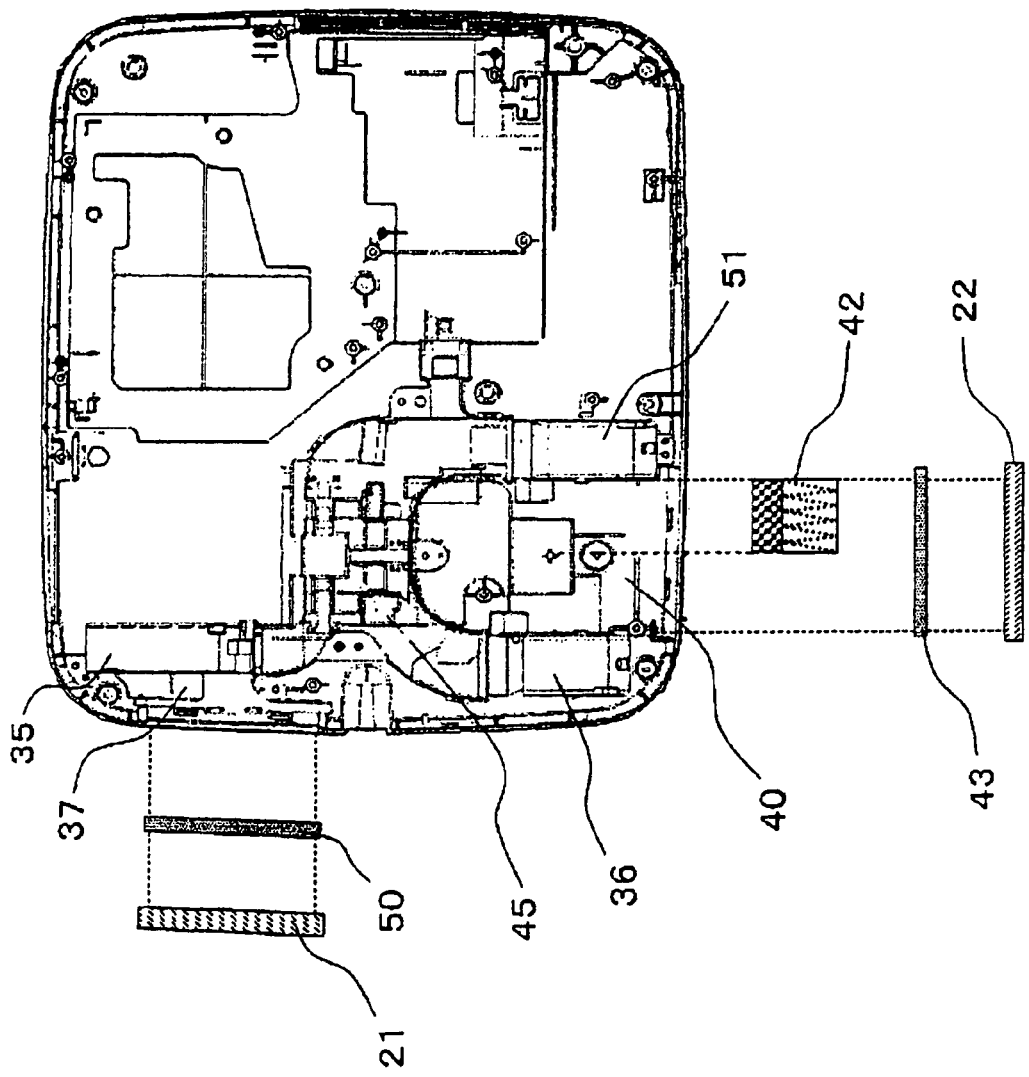

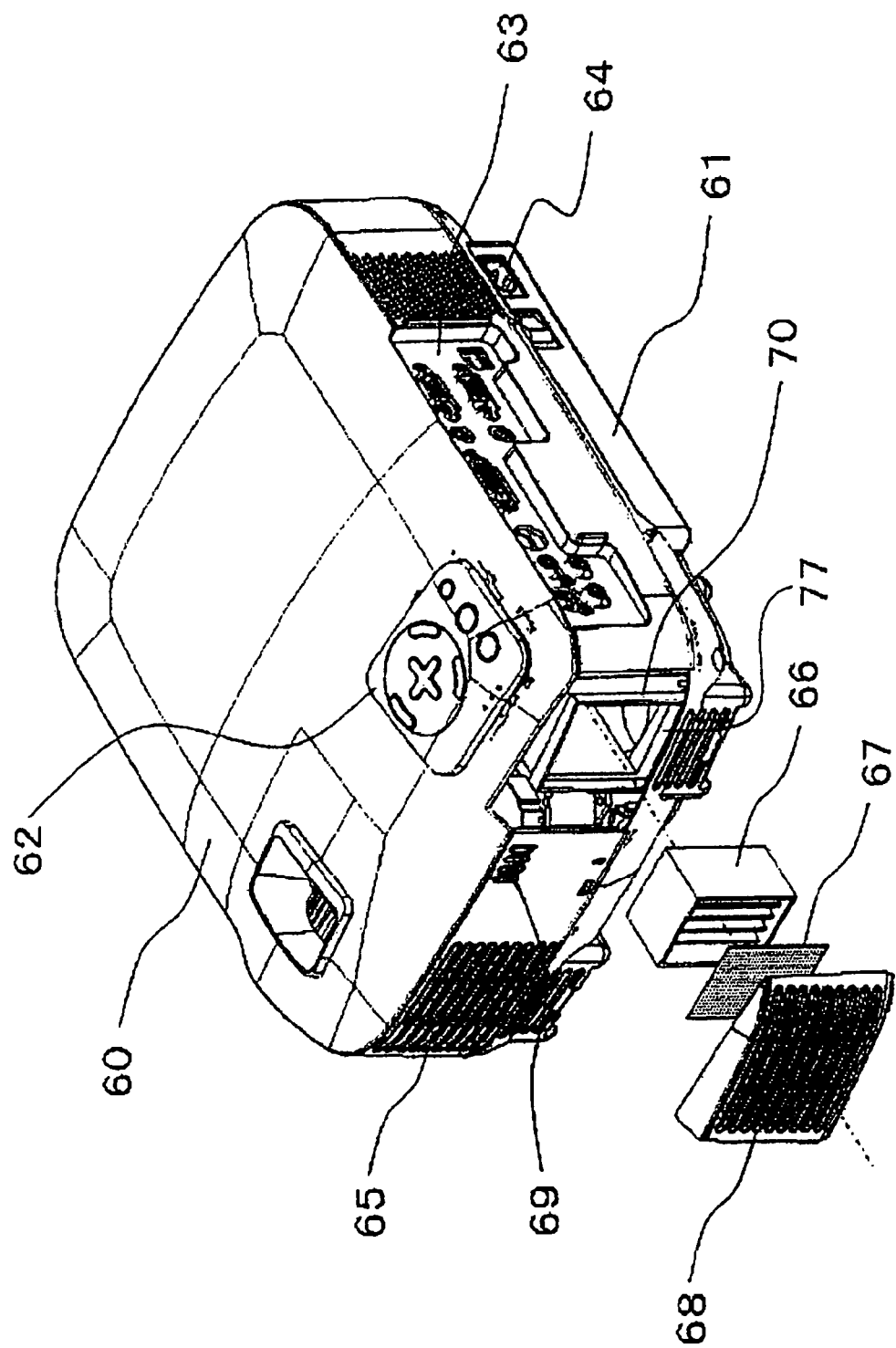

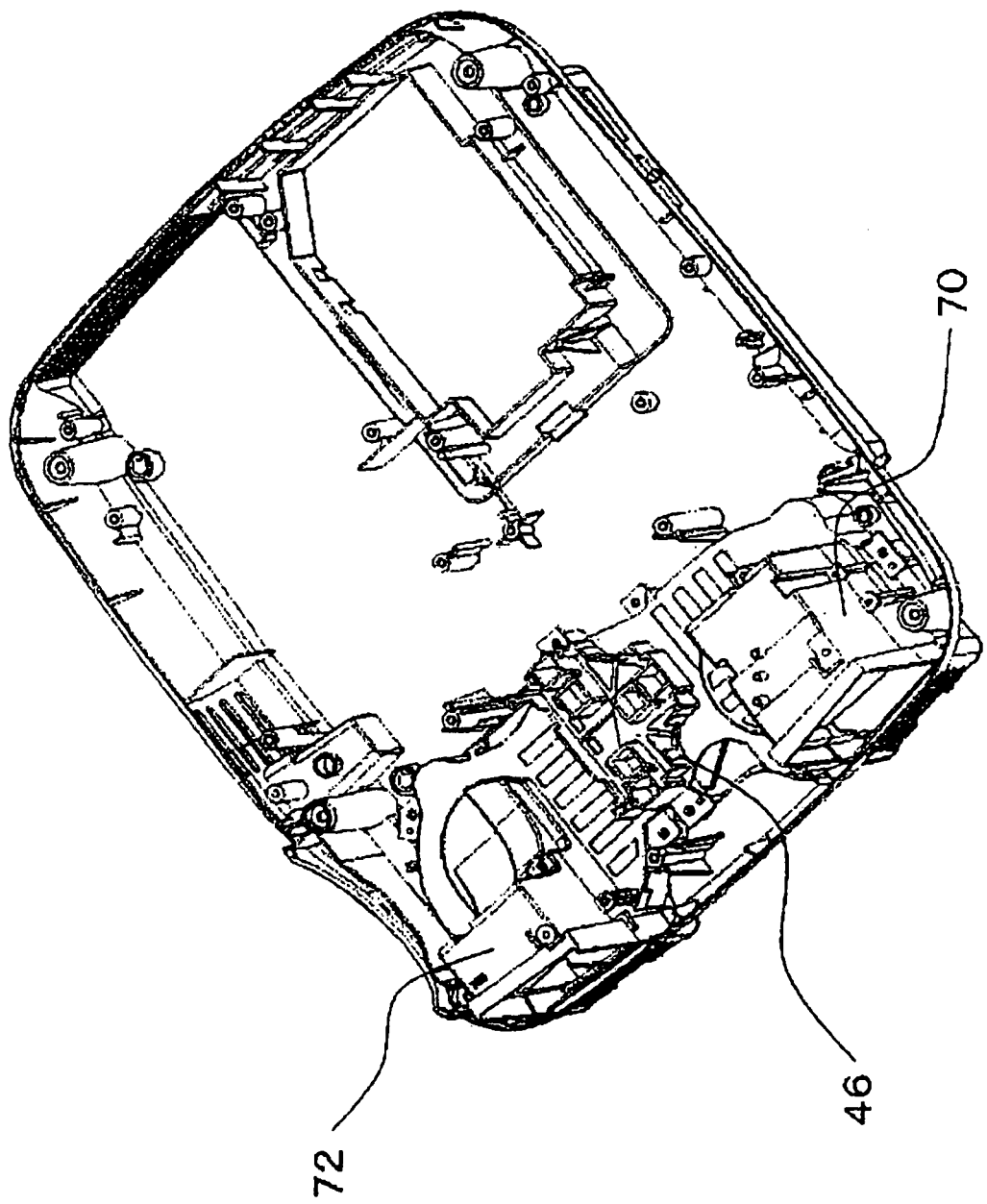

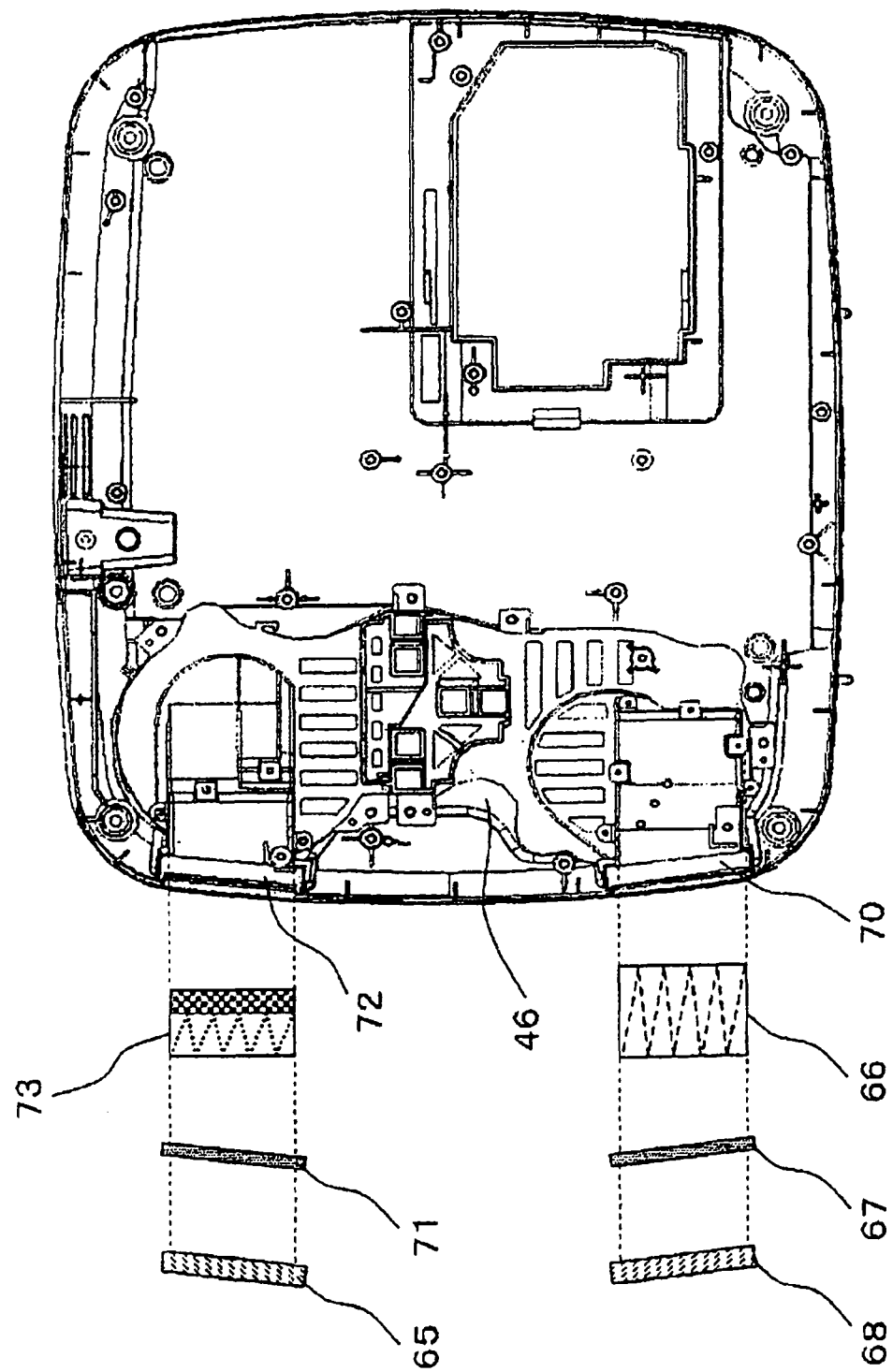

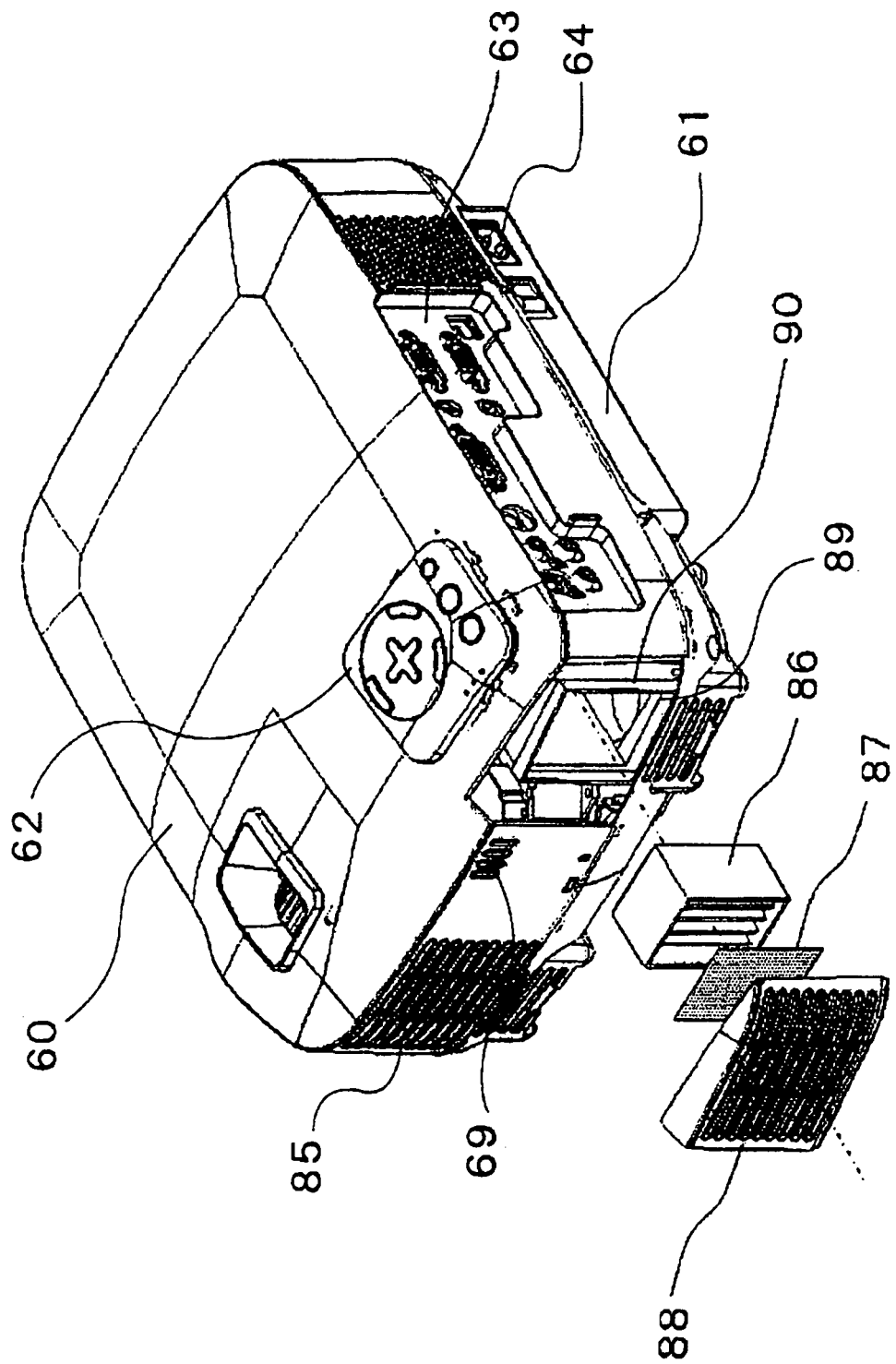

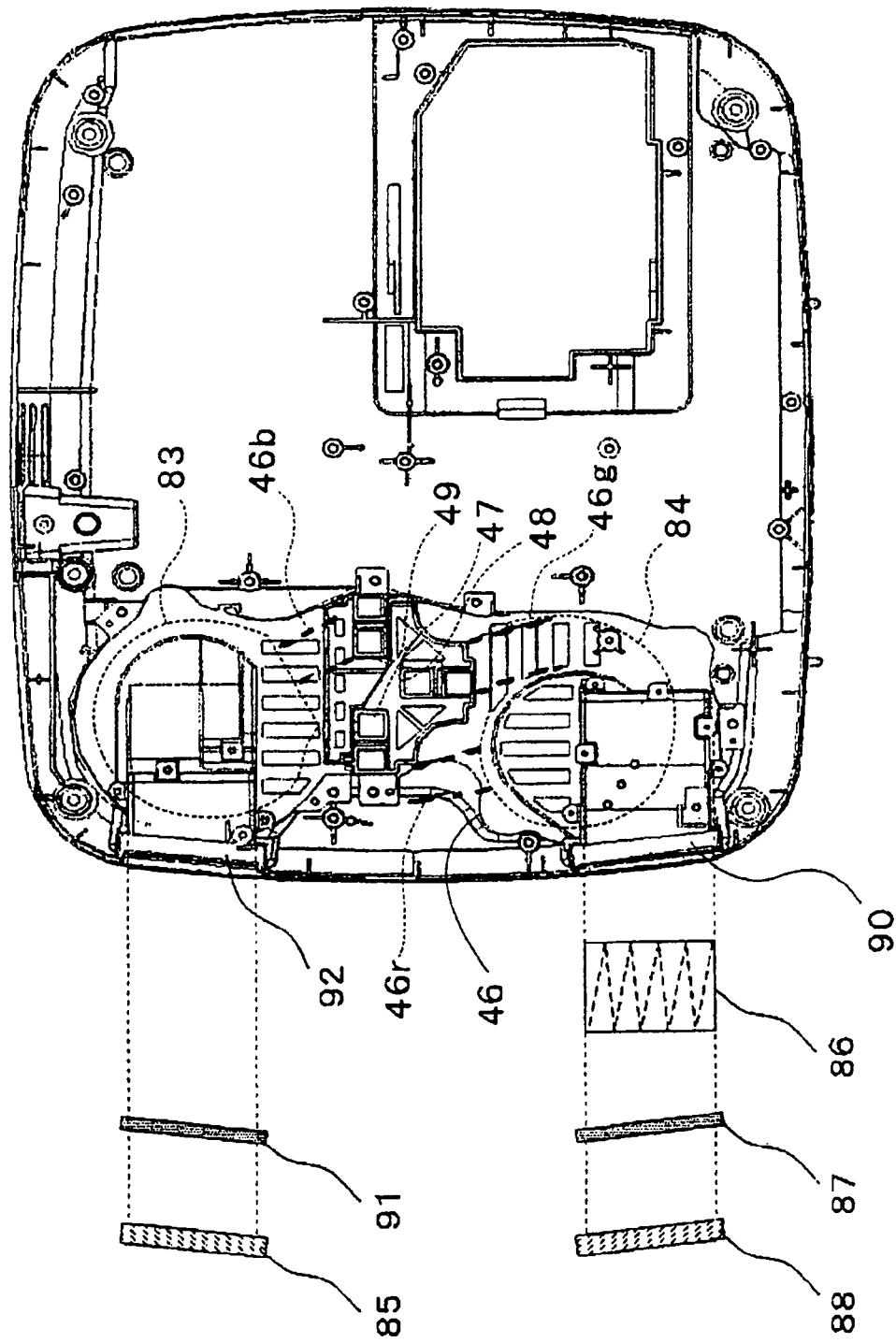

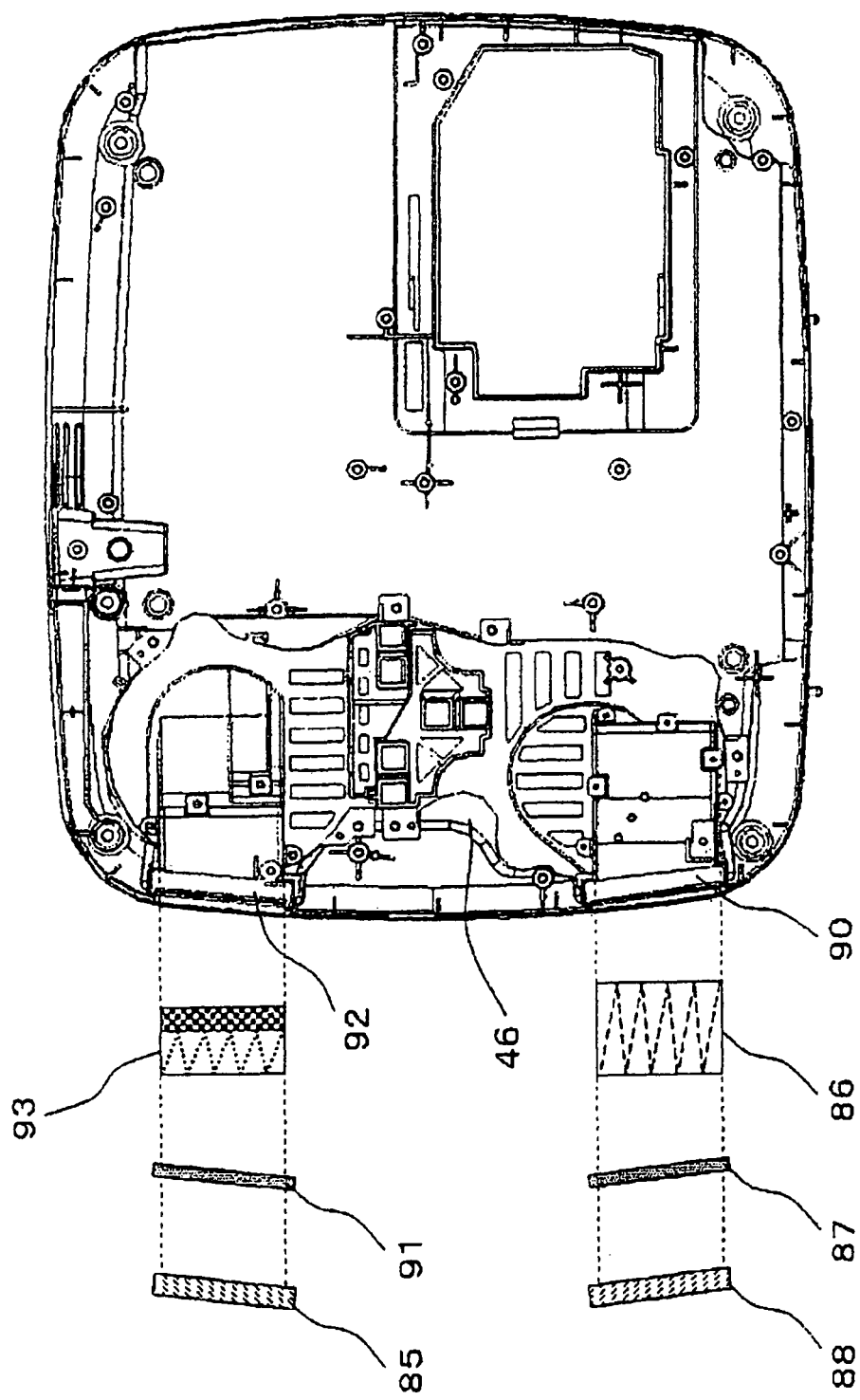

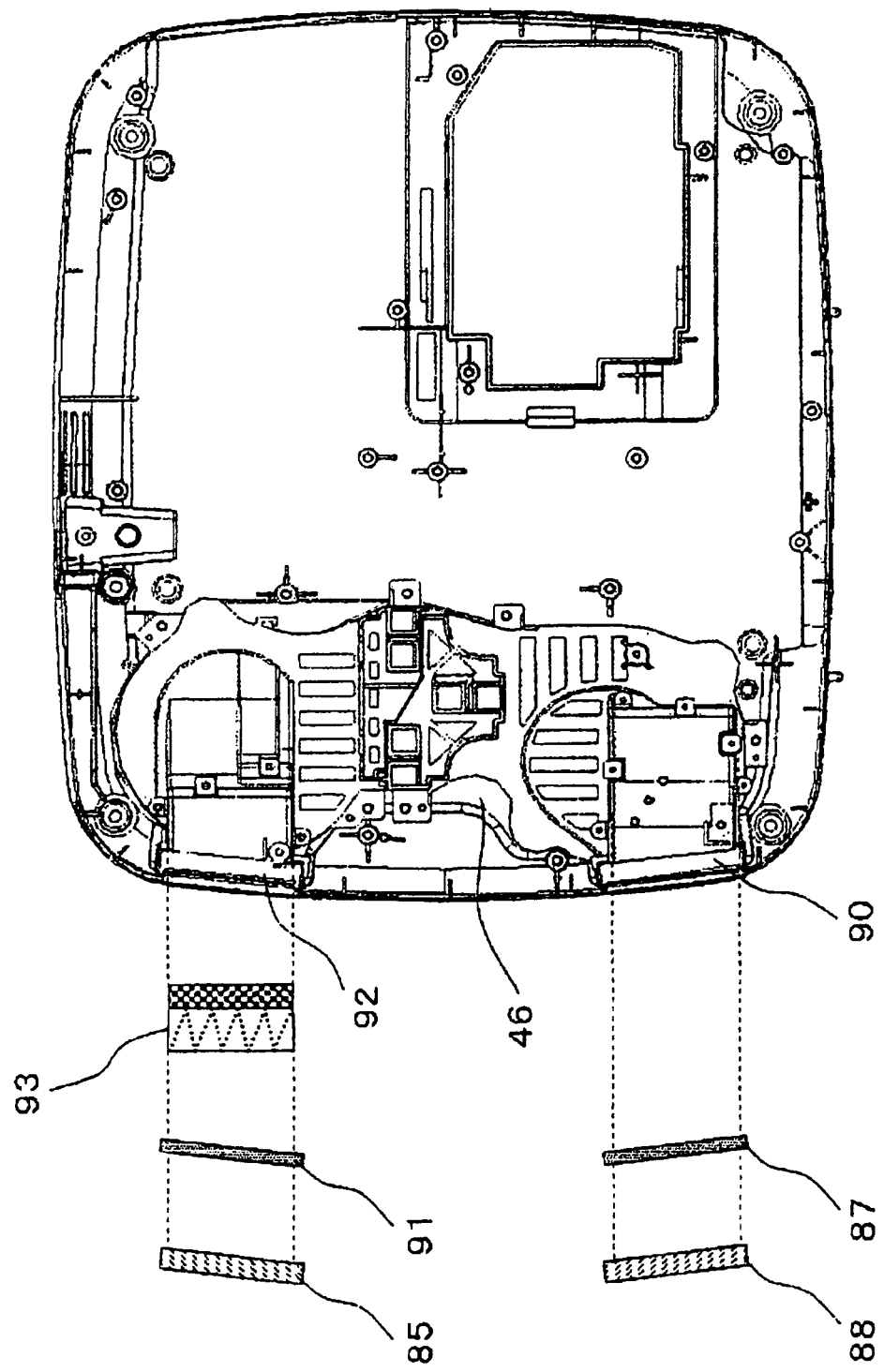

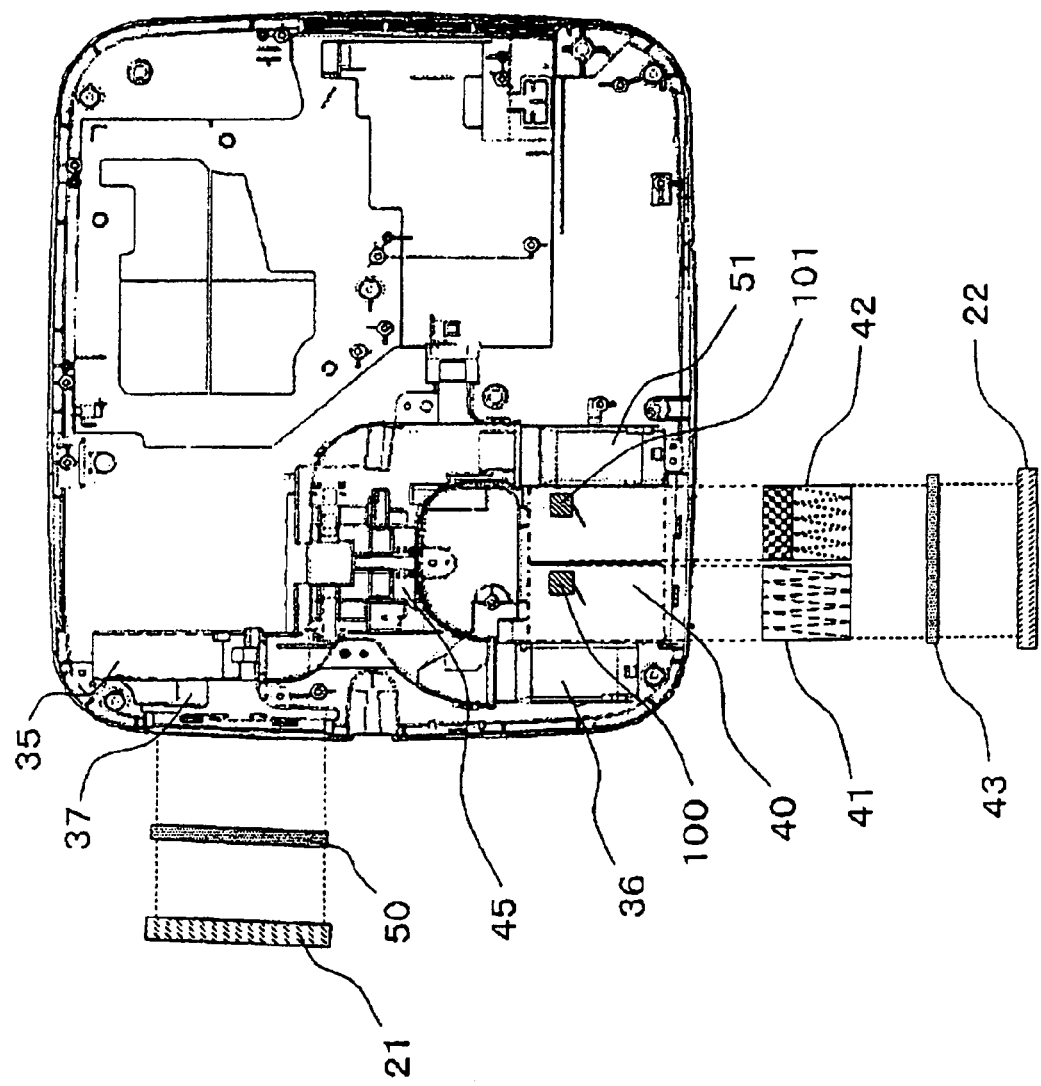

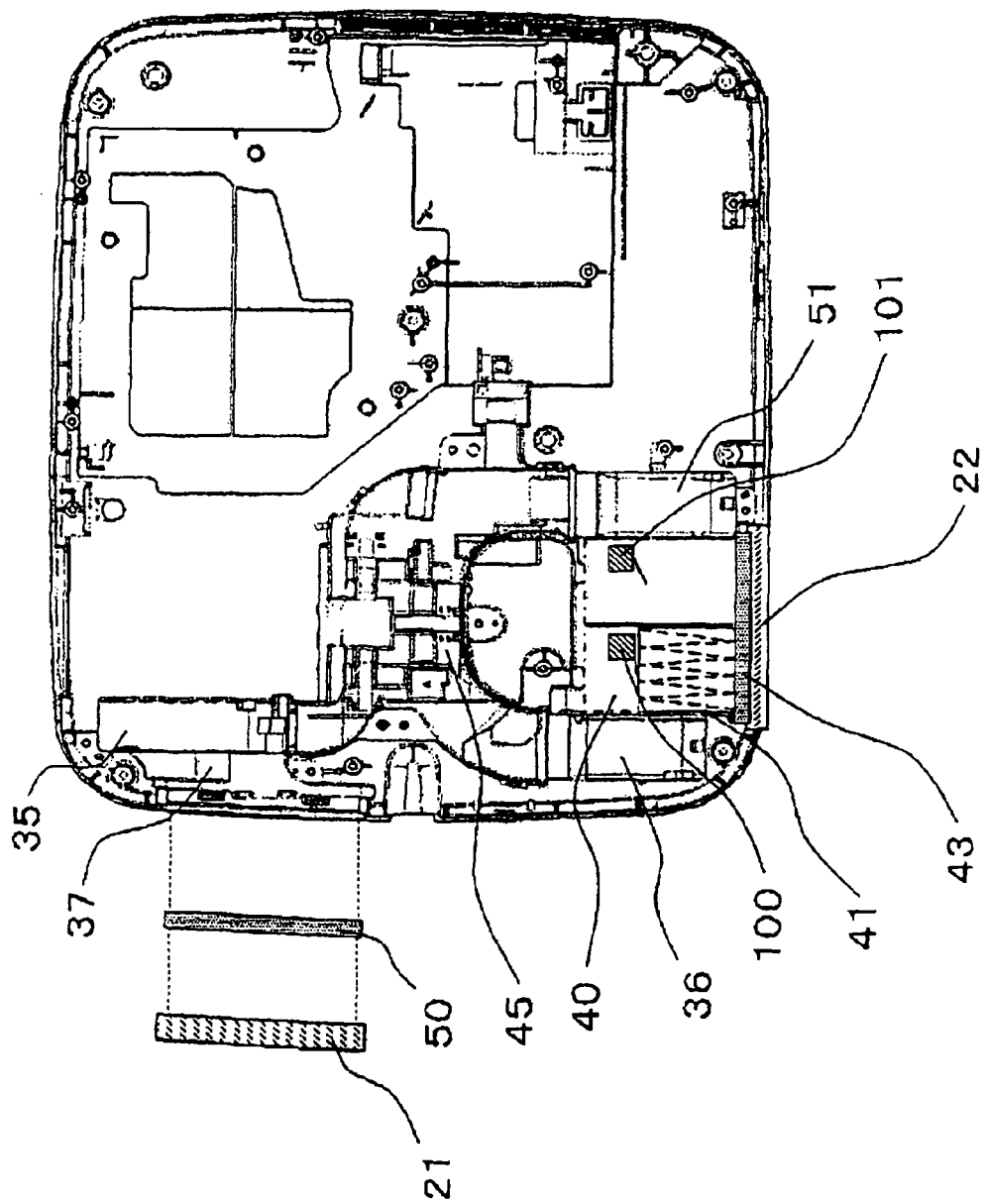

DUSTPROOF STRUCTURE OF IMAGE GENERATION DEVICE, AND PROJECTION DISPLAY DEVICE

TECHNICAL FIELD

The present invention relates to a dustproof structure of an image generation device such as a liquid crystal display (LCD) panel and a DMD (Digital Micromirror Device), for example, and a projection display device equipped with this dustproof structure.

BACKGROUND ART

In these years, there has been an increase in the cases of using display devices in environments with a lot of dust particles such as in stores and the outdoors, for example. In the case where dust particles enter the inside of the projection display device, the dust particles become attached to optical components to cause phenomena including a reduction in brightness, color irregularities, or the reflection of the attached dust particles in projection images, resulting in a reduction in optical performance. For this reason, the techniques of improving dust-proof properties of the projection display device are important. For dustproof structures relating to the present invention, such configurations are disclosed in which the projection display device is entirely dust-proofed and an LCD unit is dust-proofed.

In JP2003-241310A (Patent Document 1), a configuration is disclosed in which a projection display device is entirely covered with a protection cabinet and the protection cabinet is provided with an air filter and cooling fans. In this dustproof structure, dust particles are removed from air admitted from the outside into the inside of the protection cabinet with the air filter, so that the entire projection display device is surrounded by cooling air after dust particles are removed.

In addition, JP2007-292805A (Patent Document 2) describes a projection display device that is a so-called three-plate liquid crystal projector in which an LCD panel (in the following, abbreviated to LCD) that generates images to be projected is individually provided in a red optical path (R optical path), green optical path (G optical path), and blue optical path (B optical path). In addition, in this description, "red" is abbreviated to R, "green" to G, and "blue" to B. In Patent Document 2, a configuration is disclosed in which dust particles are removed from cooling air supplied to an LCD unit having three LCDs. On the discharge side of a cooling fan that delivers cooling air to the LCD unit, draft air ducts are provided, each of which corresponds to the G optical path and the B optical path, and different air filters are individually provided for these draft air ducts. To the G optical path and the B optical path, cooling air is delivered, from which dust particles are removed with the air filters.

In this dustproof structure, generally, the B component in optical energy applied to the LCD is the largest and the R and G components are almost the same, so that a configuration is adopted in which priority for cooling is accorded to B optical path ahead of G optical path. Thus, in this dustproof structure, the dust collection performance of the air filter provided in the draft air duct for the B optical path is set lower than that of the air filter provided in the draft air duct for the G optical path. With this configuration, the draft air duct for the B optical path has ventilation resistance, which is caused by the air filter, smaller than that of the draft air duct for the G optical path, resulting in an improved cooling performance.

Now, the configuration described in Patent Document 1 mentioned above is the configuration in which the entire projection display device is dust-proofed by removing dust particles that are contained in the entire cooling air admitted into the projection display device. Because of this, this configuration has a poor cooling performance of the projection display device, resulting in a relatively large calorific value of the projection display device. Consequently, in this configuration, a large air quantity is necessary to sufficiently cool the entire projection display device. On one hand, in order to improve dust-proof properties, it is necessary to use an air filter with a relatively smaller filter mesh size, so that the air filter tends to be clogged. More specifically, in this configuration, an air filter having a relatively large area is needed such as an air filter equipped in an air cleaner, for example. Moreover, because of the configuration in which the entire projection display device is covered with the protection cabinet, the size and weight of the device is increased, and it is necessary that the protection cabinet have a structure that maintains high sealing properties. Furthermore, for the cooling fan equipped in the projection display device, it is necessary to provide a plurality of high static pressure fans in order to overcome the ventilation resistance of the air filter.

However, even in the case of using the air filter with a relatively large area, the air filter is sometimes clogged due to the use of the air filter in adverse environments or due to its use for a long period of time. In the case where the air filter is clogged, it becomes difficult to deliver sufficient cooling air to components mounted on the inside of the projection display device. As a result, the temperature of the mounted components increases which causes malfunctions, resulting in a considerably shortened lifetime of the mounted components. In addition, the projection display device may even be stopped because of the activation of a protection circuit.

Moreover, in the configuration described in Patent Document 2 mentioned above, because the air filters are provided in the draft air ducts, whose opening area is relatively narrow, on the discharge side of the cooling fan, it is difficult to sufficiently and without fail provide the cross sectional area for ventilation, and the air filters tend to be clogged. Because the dust collection performance of the air filter provided in the draft air duct for the B optical path is poor, clogging tends to occur in the air filter provided in the draft air duct for the G optical path. In the case where the air filter provided in the draft air duct for the G optical path is clogged, the air quantity increases in the draft air duct for the B optical path with a small ventilation resistance. Thus, the temperature of the optical components provided in the draft air duct for the G optical path rapidly rises. The increase in the air quantity in the draft air duct for the B optical path causes clogging also in the air filter in the draft air duct for the B optical path, resulting in a considerable increase in the temperature of the optical components due to inevitable blockage of the draft air ducts in both optical paths. Thus, a reduction in the lifetime of the mounted components and breakage of the mounted components tend to occur.

Furthermore, in the configuration described in Patent Document 1, the dust collection performance of the air filter provided in the B optical path is lower than that of the air filter provided in the G optical path. Because of this, this configuration has problems in which a reduction in brightness is greater in the B optical path than in the G optical path and in which projection images are tinted yellow, that is, the temperature rises.

Moreover, in the configuration described in Patent Document 1, the air filter is provided in the draft air duct on the discharge side of the cooling fan, and this causes the ventilation area of the draft air duct to become narrow, resulting in a large increase in ventilation resistance. Consequently, in order to implement the desired cooling performance, it is necessary to increase the number of revolutions of the cooling fan, causing a problem in which noise is increased with the rotation of the cooling fan. More specifically, the configuration of this dustproof structure has problems in which the air filter tends to be clogged, projection images are tinted yellow, and noise is increased.

Furthermore, it is necessary for the projection display device, which is installed in adverse environments having a considerable amount of dust particles, to frequently change the air filter. However, in the configurations of the aforementioned two publications an operation is required for disassembling the projection display device when removing the air filter, thus causing a problem in which changing the air filter becomes a complicated operation. Consequently, in consideration of frequent change of the air filter, the aforementioned configurations cannot sufficiently be adapted to the projection display device installed in adverse environments.

DISCLOSURE OF THE INVENTION

It is an object of the present invention to provide a dustproof structure of an image generation device and a projection display device that can solve the problems in the aforementioned related techniques. Examples of the object are to prevent a reduction in brightness of projection images and a change in the color temperature of projection images and to reduce noise caused by the cooling fan.

A dustproof structure of an image generation device according to an aspect of the present invention includes: image generation devices one each corresponding to red, green, and blue; an air duct for red, an air duct for green, and an air duct for blue provided so as to individually blow cooling air to the image generation devices; a first air filter provided for each of the air ducts for red, the air ducts for green, and the air ducts for blue; and a second air filter provided for at least one air duct of the air ducts for green and the air ducts for blue, a second air filter having filter mesh size smaller than that of the first air filter.

In addition, a projection display device according to the present invention includes the dustproof structure of an image generation device according to the present invention.

BRIEF DESCRIPTION OF THE DRAWINGS

FIG. 2E is an exploded plan view depicting the LCD duct of the projection display device according to the first embodiment;

FIG. 2F is an exploded plan view depicting a projection display device according to a second embodiment;

FIG. 2G is an exploded plan view depicting a projection display device according to a third embodiment;

FIG. 3A is an exploded perspective view depicting a projection display device according to a fourth embodiment;

FIG. 3B is an exploded perspective view depicting an LCD duct of the projection display device according to the fourth embodiment;

FIG. 3D is an exploded plan view depicting a projection display device according to a fifth embodiment;

FIG. 4A is an exploded perspective view depicting a projection display device according to a seventh embodiment;

FIG. 4B is an exploded plan view depicting the projection display device according to the seventh embodiment;

FIG. 4C is an exploded plan view depicting a projection display device according to an eighth embodiment;

FIG. 4D is an exploded plan view depicting a projection display device according to a ninth embodiment;

FIG. 5A is an exploded plan view depicting a projection display device according to a tenth embodiment;

FIG. 5B is an exploded plan view depicting the state in which the projection display device according to the tenth embodiment is attached with only a G air filter;

BEST MODE FOR CARRYING OUT THE INVENTION

In the following, embodiments of the present invention will be described with reference to the drawings.

An exemplary configuration of a projection display device will be described, to which a dustproof structure of an image generation device according to the present invention is adopted. A projection display device according to the embodiments is a three-plate liquid crystal projector in which an LCD as an image generation device that generates images to be projected is provided in each of an R optical path, G optical path, and B optical path.

The projection display device according to the embodiments includes a cabinet, an air intake opening provided on the cabinet, an air intake louver as a louver member detachably provided over the air intake opening, an air intake duct that is provided on the air intake side of a cooling fan for cooling optical components and that communicates with the air intake port of the air intake louver, and an LCD duct provided on the discharge side of the cooling fan to blow cooling air to the LCD. In addition, the optical components refer to components including the LCD, polarizers disposed on the LCD on the front and rear side of the optical path, or the like. In the following, individual optical components provided in each of the R optical path, G optical path, and B optical path are referred to as R optical components, G optical components, and B optical components. Moreover, in the present invention, individual air ducts provided so as to blow cooling air to the individual optical components refer to air ducts including the air intake passage of the air intake duct and the draft air duct of the LCD duct.

FIGS. 1A to 2F show embodiments in the case where the present invention is adapted to a projection display device having an air intake opening in the left side surface and rear surface of a cabinet. FIGS. 1A to 2E show a first embodiment, FIG. 2F shows a second embodiment, and FIG. 2G shows a third embodiment. FIGS. 3A to 5D show embodiments in the case where the present invention is adapted to a three-plate projector having an air intake opening in the left side surface of a cabinet. FIGS. 3A to 3C show a fourth embodiment, FIG. 3D shows a fifth embodiment, and FIG. 3E shows a sixth embodiment. FIGS. 4A and 4B show a seventh embodiment, FIG. 4C shows an eighth embodiment, and FIG. 4D shows a ninth embodiment. FIGS. 5A to 5D and Table 1 show a tenth embodiment.

<First Embodiment>

FIGS. 1A to 2D show the first embodiment, which is the best mode. A projection display device according to the first embodiment is an exemplary configuration having an air intake opening in the left side surface and rear surface of a cabinet.

Figure 1A:
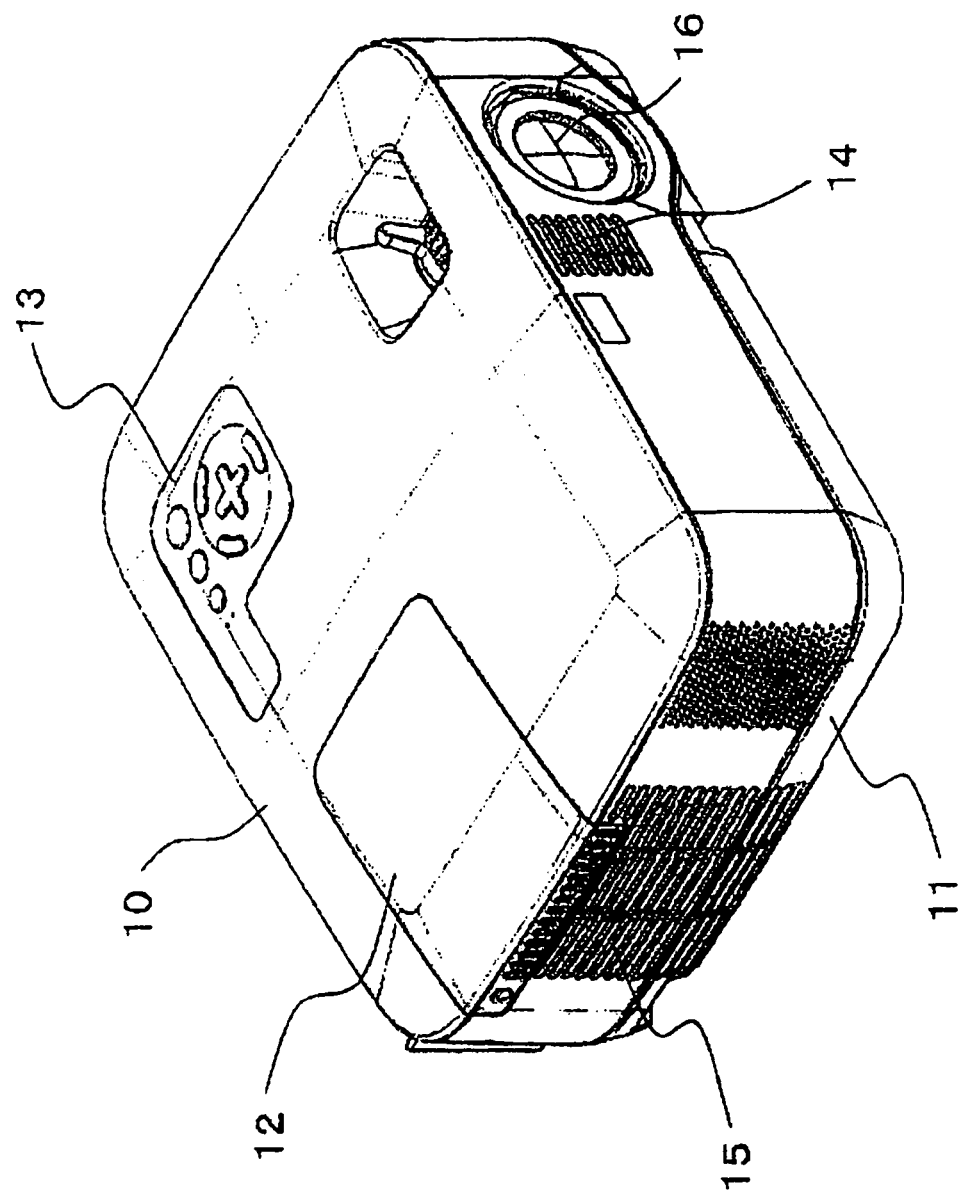
FIG. 1A is a perspective view depicting a projection display device according to a first embodiment seen from the front surface side.

FIG. 1A is a perspective view depicting the projection display device seen from the front direction. As shown in FIG. 1A, the cabinet is formed of three structural components, bottom cabinet 11, upper cabinet 10, and lamp cover 12. The components mounted on the inside of the projection display device are fixed and supported mainly on bottom cabinet 11. Upper cabinet 10 is provided with manipulation button 13 that is manipulated by a user. On the front surface of the cabinet, inflow port 14 is provided to admit outside air into the inside of the cabinet.

On the inner side of the cabinet at inflow port 14, a temperature sensor, described later, is provided as a temperature detecting means for detecting the temperature of air flowing from the outside into the inside of the cabinet.

In addition, projection lens 16 is provided on the front surface of the cabinet, and projection lens 16 projects images generated in an LCD unit formed of three LCDs onto the projection surface of a screen (not shown).

Figure 1B:
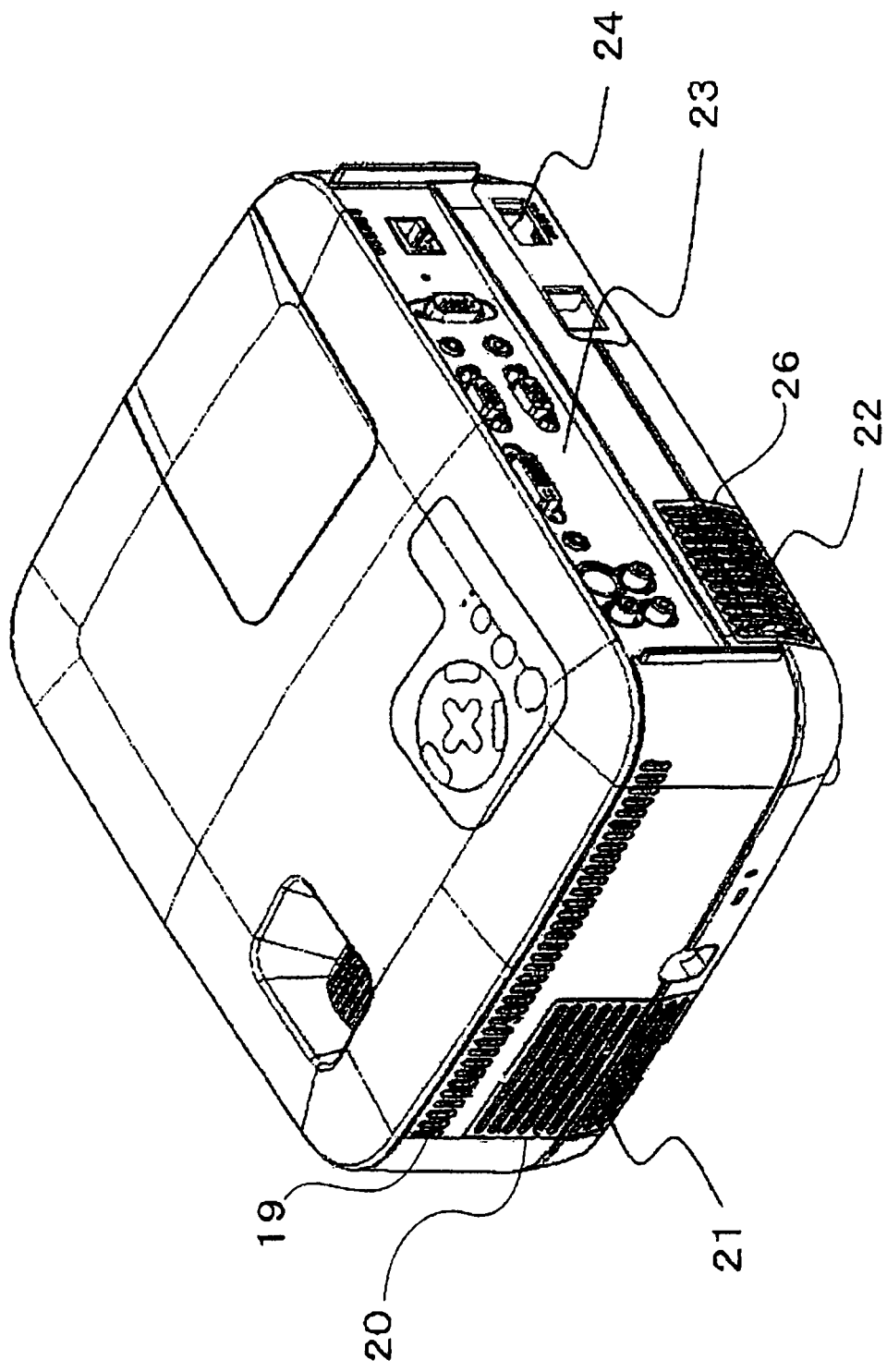
FIG. 1B is a perspective view depicting the projection display device according to the first embodiment seen from the rear surface side.

FIG. 1B is a perspective view depicting the projection display device seen from the rear direction. As shown in FIG. 1B, on the left side surface of the cabinet, inflow port 19 is provided to admit outside air into the inside of the cabinet. Moreover, in the left side surface of the cabinet, R air intake opening 20 is provided to deliver outside air to the R optical components provided in the R optical path. R air intake louver 21 that admits outside air is detachably provided over this R air intake opening 20. Furthermore, in the rear surface of the cabinet, GB air intake opening 26 is provided to deliver outside air to the G optical components provided in the G optical path and the B optical components provided in the B optical path. GB air intake louver 22 that admits outside air is detachably provided over GB air intake opening 26. R air intake louver 21 and GB air intake louver 22 each include a plurality of air intake ports.

Moreover, on the rear surface of the cabinet, IO terminal panel 23 and AC inlet 24 are provided. IO terminal panel 23 has signal input terminals from other electronic devices such as a PC (personal computer), DVD (Digital Versatile Disc) player, or the like and signal output terminals to other display devices. AC inlet 24 is a cable receptacle that supplies electric power from the outside to the projection display device. Furthermore, as shown in FIG. 1A, on the right side surface of the cabinet, air outlet port 15 is provided to evacuate air in the inside of the cabinet to the outside.

Figure 1C:
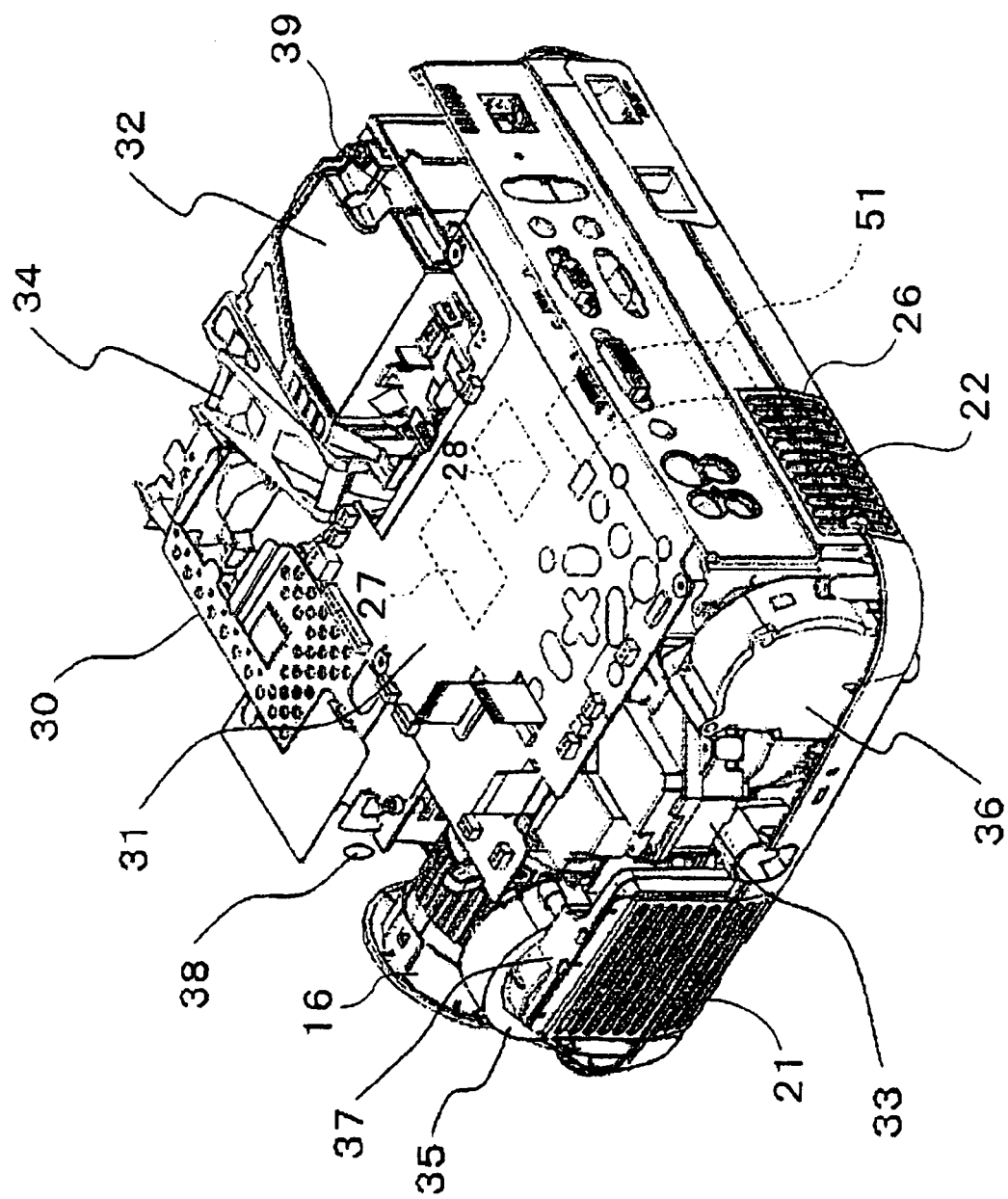
FIG. 1C is an exploded perspective view depicting the projection display device according to the first embodiment seen from the rear surface side.

FIG. 1C is a perspective view depicting the state in which upper cabinet 10 is removed from the state shown in FIG. 1B. The electric power supplied from the outside is subjected to power control such as voltage transformation by power supply 30, and the electric power is supplied to a ballast power supply (not shown) that causes a lamp (not shown) to emit light as a light source that radiates light to the LCD, and to main circuit board 31. The ballast power supply adjusts power in such a way that the ballast power supply causes a lamp provided in lamp unit 32 to radiate light and stably maintains the light emitting state, or the ballast power supply changes the power quantity to be supplied to the lamp. As shown in FIG. 1C, main circuit board 31 has non-volatile memory 27 as a storage means for storing a plurality of kinds of information and control circuit unit 28 as a control means for performing a plurality of kinds of control. Main circuit board 31 generates images as by individually controlling three LCDs, drives and controls the entire projection display device, and stores a plurality of kinds of information relating to these kinds of control, based on external signals. Light emitted from the luminous lamp is separated by a plurality of optical components provided in optical engine 33, and applied onto the individual LCDs. In the individual LCDs, images are generated based on image signals, enlarged by projection lens 16, and projected onto the projection surface such as a screen, through an optical combining unit (not shown) provided in the LCD unit.

In the projection display device, power supply 30 and a stabilizer, main circuit board 31, the lamp, the optical components in optical engine 33, or the like generate heat to cause a temperature rise with this series of projecting operations. Temperature rises in the electronic components and optical components degrade these constituent components and shorten the lifetime. Thus, in order to prevent temperature rises in these constituent components, cooling fans are used to cool the constituent components. As shown in FIG. 1C, to the G optical components and the B optical components in optical engine 33, cooling air admitted by G sirocco fan 36 and B sirocco fan 51, which are first cooling fans, is delivered through GB air intake louver 22 and GB air intake duct 40 (not shown). To the R optical components, cooling air admitted by R sirocco fan (multiblade fan) 35, which is a second cooling fan, is delivered through air intake louver 21 and R air intake duct 37.

Moreover, the projection display device includes exhaust fan 34 that evacuates cooling air, which is discharged into the inside of the cabinet after cooling the LCD unit, or air, which flows from inflow ports 14 and 19, from air outlet port 15 to the outside of the cabinet. Furthermore, lamp unit 32 includes light source fan 39 that cools the lamp. At this time, temperature sensor 38 detects the temperature of outside air, which flows from inflow port 14, and sends information to control circuit unit 28 on main circuit board 31. Control circuit unit 28 on main circuit board 31 controls the number of revolutions of each of sirocco fans 35, 36, and 51, exhaust fan 34, and light source fan 39 to a predetermined number of revolutions according to the temperature of outside air detected by temperature sensor 38, based on information about the temperature of outside air stored in advance and the number of revolutions of each of the individual fans.

Figure 2A:
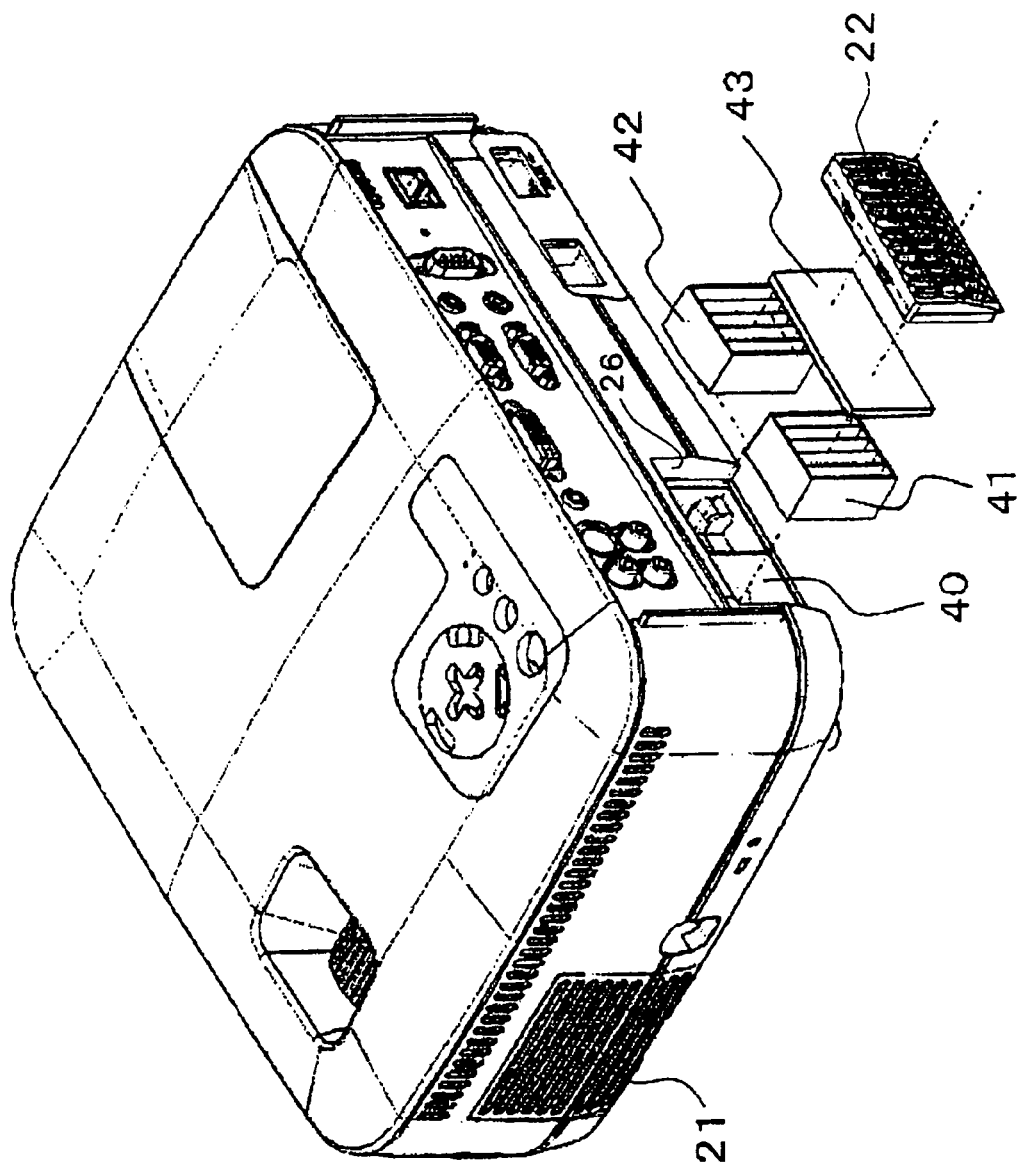
FIG. 2A is an exploded perspective view depicting a green optical path and a blue optical path of the projection display device according to the first embodiment.
Figure 3C:
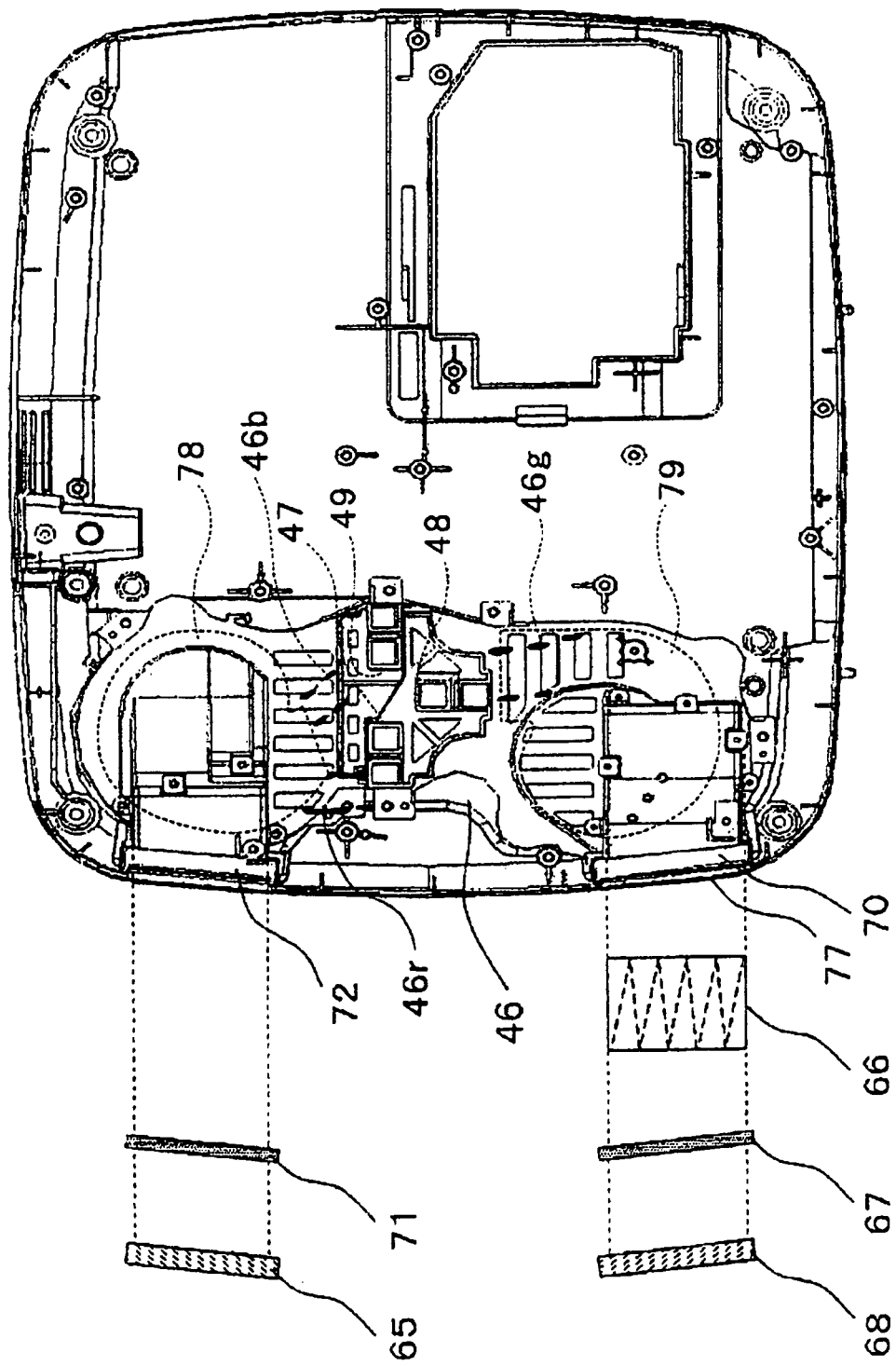
FIG. 3C is an exploded plan view depicting the LCD duct of the projection display device according to the fourth embodiment.
Figure 3E:
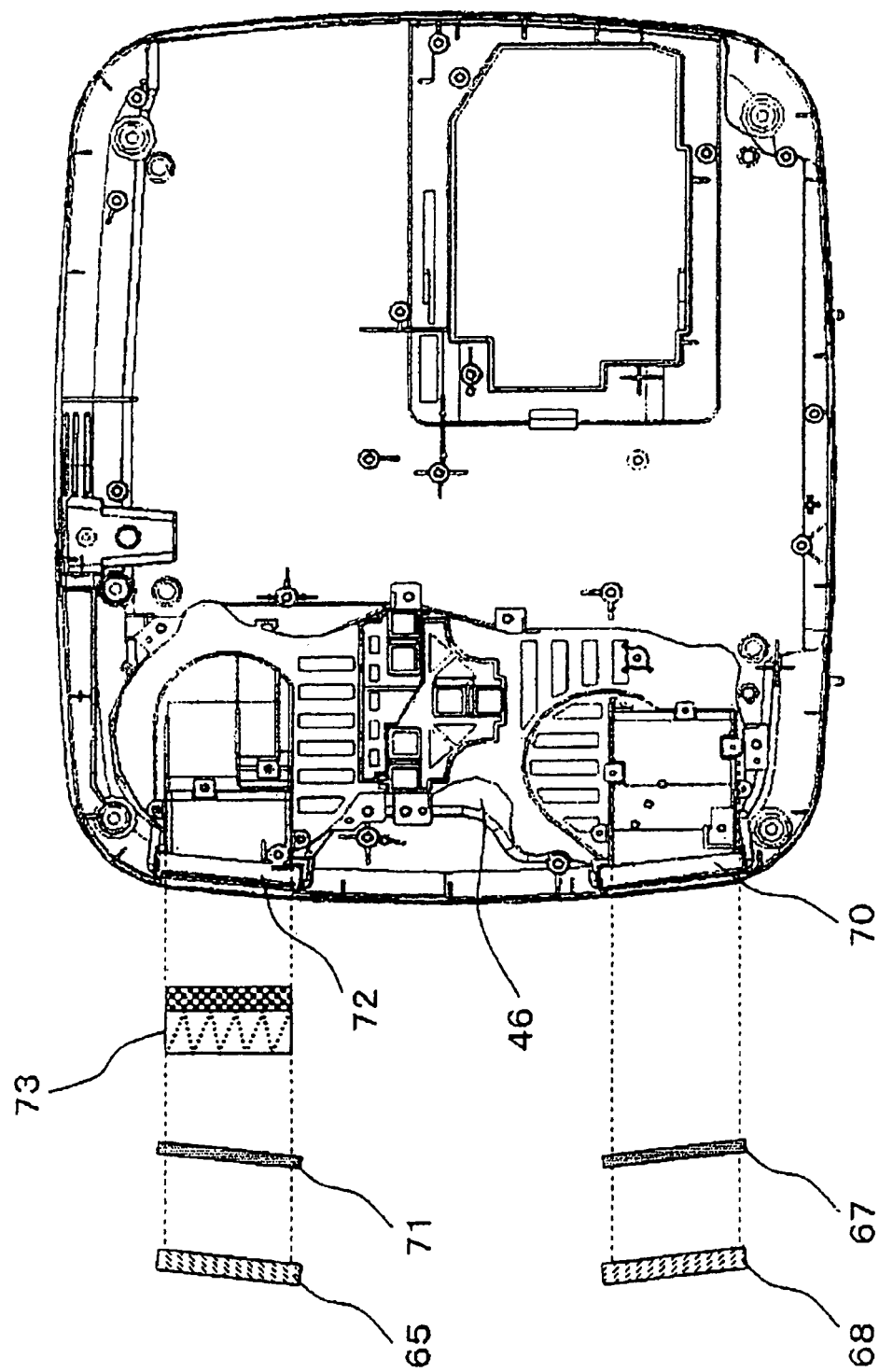
FIG. 3E is an exploded plan view depicting a projection display device according to a sixth embodiment.

FIG. 2A is a perspective view in which GB air intake louver 22 is removed from GB air intake opening 26 of the cabinet and the individual air filters are disassembled.

In the inside of the cabinet, GB air intake duct 40 is provided between G sirocco fan 36 and B sirocco fan 51, which are provided in the inside of the projection display device, and GB air intake louver 22, as shown in FIG. 2a. This GB air intake duct 40 is formed to have two air intake passages for individually cooling the G optical components and the B optical components. GB air intake duct 40 is provided with GB air filter 43, which is a first air filter (prefilter), at the position adjacent to GB air intake louver 22. In addition, in the two air intake passages of GB air intake duct 40, G air filter 41 and B air filter 42, which are second air filters, are slidably supported and mounted; the filter mesh size is finer (smaller) than that of GB air filter 43. G air filter 41 and B air filter 42 are disposed between GB air filter 43 and G sirocco fan 36 and B sirocco fan 51.

The opening area of GB air intake duct 40 is formed larger than that of the LCD duct, whose opening area is relatively narrow, in order to blow cooling air to the LCDs. Because of this, G air filter 41 and B air filter 42 are provided in GB air intake duct 40, so that it is possible to increase the cross sectional area for ventilation of the filters than that in the configuration in which the filter is provided in the LCD duct, and it is possible to prevent clogging.

GB air filter 43 is a urethane porous filter, which is an air filter comprising a few tens cells per inch and having an approximately moderate performance. GB air filter 43 is retained and held on the inner side of GB air intake louver 22 with a retention claw. GB air intake louver 22 is mounted in such a way that a projection provided on the upper end is fit into a recessed part provided at GB air intake opening 26 of the cabinet.

Then, G air filter 41 and B air filter 42 are held in GB air intake duct 40 by mounting GB air intake louver 22 over GB air intake opening 26 of the cabinet. It is possible to readily change these three air filters 41, 42, and 43 through this GB air intake opening 26, or from the inside of the cabinet by removing GB air intake louver 22 from GB air intake opening 26. Here, the structures of G air filter 41 and B air filter 42 will be described with reference to cross sectional views.

Figure 2B:
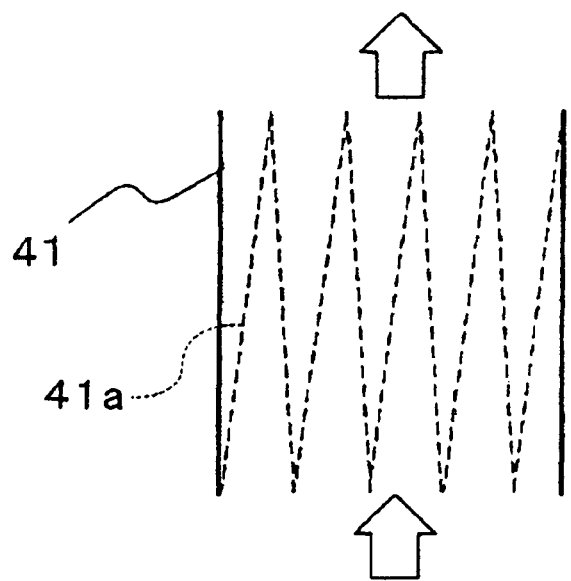
FIG. 2B is a cross sectional view depicting a G air filter provided in the projection display device according to the first embodiment.
Figure 2C:
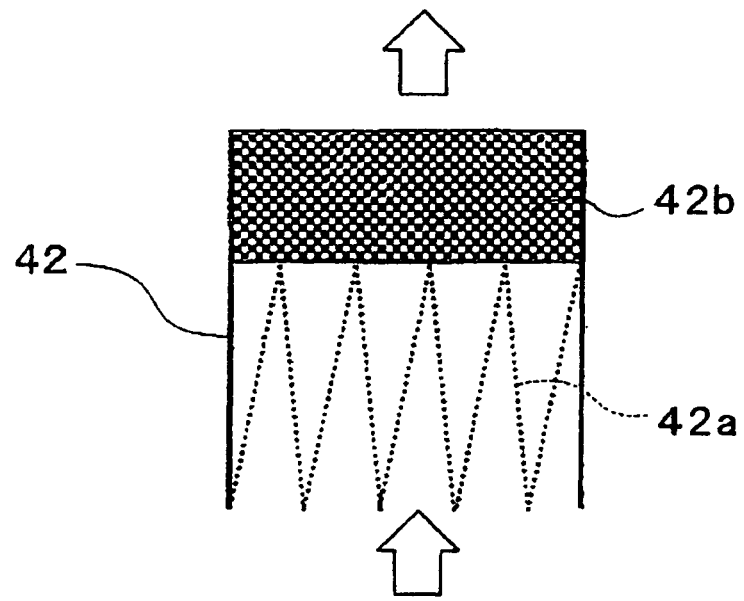
FIG. 2C is a cross sectional view depicting a B air filter provided in the projection display device according to the first embodiment.

FIG. 2B shows a cross sectional view depicting G air filter 41, and FIG. 2C shows a cross sectional view depicting B air filter 42. The ventilation directions of G air filter 41 and B air filter 42 are the directions of arrows shown in the drawings.

As shown in FIG. 2B, the inside of G air filter 41 is in the structure configured in which nonwoven fabric 41a is folded at about eight times; a HEPA filter (High Efficiency Particulate Air Filter) with a high performance of removing dust particles is adopted as this nonwoven fabric 41a. The reason why the structure of folding the HEPA filter is adopted is that ventilation resistance is reduced and the amount of dust particles to attach per unit area is decreased for prolonging the lifetime of G air filter 41.

On the other hand, as shown in FIG. 2C, the inside of B air filter 42 includes a portion configured to fold nonwoven fabric 42a at eight times as well as a portion in which activated carbon 42b is filled in a bag-shaped nonwoven fabric; it is a double structure in which these two portions are disposed along the ventilation direction. As this non-woven fabric 42a, an ULPA filter (Ultra Low Penetration Air Filter) is adopted, which has a much higher performance for removing dust particles. Activated carbon 42b acts to absorb fume micro dust particles such as resin (nicotine) and oil content contained in tobacco smoke, and odors. In other words, B air filter 42 in the double structure functions as the second air filter with a finer mesh size than that of G air filter 41.

In the case of preventing only a reduction in brightness of the projection display device, it is sufficient to prevent dust particles from attaching to the G optical components. However, in the case of preventing a change in the color temperature of projection images (changing into yellow), it is necessary to prevent the attachment of micro dust particles such as sand dust and tobacco nicotine to the B optical components, for which it is effective to adopt B air filter 42 in the double structure.

Figure 2D:
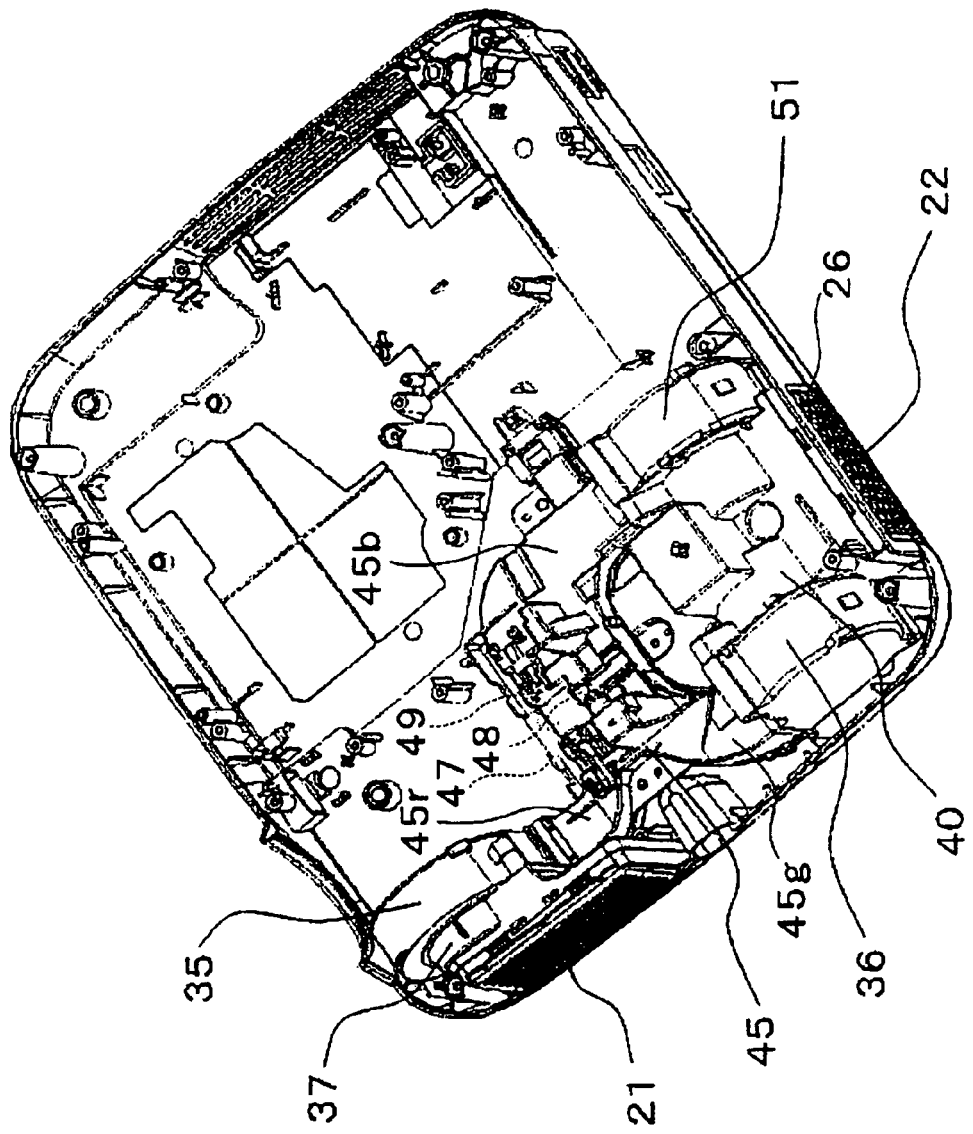
FIG. 2D is an exploded perspective view depicting an LCD duct of the projection display device according to the first embodiment.

Next, a passage of cooling air that is admitted from the outside and then delivered to the LCD unit and the structure of the passage will be described. FIG. 2D is a perspective view depicting the LCD duct through which cooling air is delivered to the LCD unit, and FIG. 2E is an exploded plan view depicting the LCD duct.

As shown in FIGS. 2D and 2E, in the inside of LCD duct 45, R draft air duct 45r, G draft air duct 45g, and B draft air duct 45b are formed, which correspond to the R optical components, G optical components, and B optical components, respectively, and a dedicated ventilation port is provided for each of the R optical components, G optical components, and B optical components therebelow, which are provided in the LCD unit.

Air admitted from R air intake louver 21 is guided to the air intake port of R sirocco fan 35 through R air filter 50 and R air intake duct 37. Cooling air discharged from the discharge port of R sirocco fan 35 is delivered to R draft air duct 45r of LCD duct 45. Then, the cooling air is passed through R draft air duct 45r and delivered to R-LCD 47, which is an R optical component.

Air admitted from GB air intake louver 22 is guided to the air intake port of G sirocco fan 36 through GB air filter 43, G air filter 41, and the air intake passage of GB air intake duct 40. Cooling air discharged from the discharge port of G sirocco fan 36 is delivered to G draft air duct 45g of LCD duct 45. Then, the cooling air is passed through G draft air duct 45g, and delivered to G-LCD 48, which is a G optical component.

In addition, air admitted from GB air intake louver 22 is guided to the air intake port of B sirocco fan 51 through GB air filter 43, B air filter 42, and the air intake passage of GB air intake duct 40. Cooling air discharged from the discharge port of B sirocco fan 51 is delivered to B draft air duct 45b of LCD duct 45. Then, the cooling air is passed through B draft air duct 45b and delivered to B-the LCD 49, which is a B optical component.

As described above, the cooling air delivered to LCD duct 45 flows from the ventilation ports individually dedicated to three optical paths toward individual LCDs 47, 48, and 49 of the LCD unit via the individual draft air ducts.

For R air filter 50 and GB air filter 43, which are the first air filters, urethane porous filters are used, both having a thickness of about 2 mm, and R air filter 50 and GB air filter 43 are comprised of 30 cells per inch and have an approximately moderate performance. G air filter 41 and B air filter 42, which are the second air filters, have the same configuration as the aforementioned configuration.

Dust particles having a particle size of about 80 μm or more are first removed from air that is admitted from the outside of the cabinet through R air filter 50 and GB air filter 43. Because the attachment of dust particles has less of an effect in reducing brightness or in changing the color temperature of the R optical components, the air that has already passed through R air filter 50 is sent, as it, to R draft air duct 45r for the R optical components.

Dust particles having a particle size of about 0.3 μm or more are removed from the air to be delivered to the G optical components through box-shaped G air filter 41 that is configured by folding a HEPA filter thereinside. Dust particles having a particle size of about 0.15 μm or more and fume micro dust particles such as tobacco nicotine are removed from the air to be delivered to the B optical components through box-shaped B air filter 42 in the double structure having an ULPA filter and activated carbon thereinside.

More specifically, R air filter 50 and GB air filter 43, which are the first air filters, have such mesh size that the mesh size of R air filter 50 is the same as that of GB air filter 43 or coarser. It is desirable that G air filter 41 and B air filter 42 in GB air intake duct 40 not be provided in the ventilation duct for the R optical components and that the mesh size of G air filter 41 be the same as that of B air filter 42 or coarser. In the case of the configuration where GB air filter 43, which is the first air filter, is separately disposed as the G optical components and the B optical components, desirably, the mesh size of G air filter 41 will be the same as that of B air filter 42 or coarser. The reason is as follows.

The attachment of dust particles has less of an effect in reducing brightness or in changing the color temperature of the R optical components. In the case of preventing a reduction in brightness by avoiding the attachment of dust particles only to the G optical components using G air filter 41, the bright state of projection images is kept relatively long, resulting in a noticeable change in the color temperature (yellow tinting). Consequently, in order to prevent a change in the color temperature, it is necessary to avoid the attachment of micro dust particles (micro sand dust, tobacco nicotine, or the like) to the B optical components using B air filter 42. On the other hand, in the case of preventing a change in the color temperature by avoiding the attachment of dust particles only to the B optical components, the effect is not observed because a reduction in brightness occurs relatively early, although projection images can be prevented from acquiring a yellow tint.

In accordance with the dustproof structure according to this embodiment by using the air cooling system, it is possible to protect the G optical components provided in the G optical path, from the attachment of dust particles, which cause a reduction in brightness of projection images, and the B optical components provided in the B optical path, from the attachment of dust particles, which cause a change in the color temperature. In addition to this, in this embodiment, it is possible to reduce air ventilation resistance against the R optical components provided in the R optical path, which has a smaller affect on projection images. With this configuration, it is possible to prevent a reduction in brightness of projection images and a change in the color temperature, and it is possible to implement a projection display device that reduces noise caused by cooling fans.

In other words, in this embodiment, the air filter is selectively and suitably provided in each of the R optical path, G optical path, and B optical path depending on the degree of the influence of the attachment of dust particles to the optical components on projection images. Thus, it is possible that excellent preservation of the optical properties of projection images is compatible with a reduction in noise caused by individual fans, so that it is possible to reduce the overall size of the device.

In addition, according to this embodiment, it is possible to readily change the air filter from the air intake duct by removing the air intake louver from the air intake opening of the cabinet. Thus, it is preferable to adapt this embodiment to projection display devices used in environments with a lot of dust particles, in which it is necessary to frequently change air filters.

In the following, the other embodiments will be described. In addition, in the other embodiments, the same constituent members as those in the first embodiment are designated the same reference numerals and signs in the first embodiment and description of these constituent members is omitted.

<Second Embodiment>

Projection display devices are installed in various environments depending on the intended use. The first embodiment was the projection display device installed in adverse environments in which sand dust, tobacco smoke, and the like are mixed. The second embodiment is an exemplary projection display device that only needs measures against sand dust in the case of using the device in the semi-outdoors or the like, and it is possible to reduce noise caused by individual fans more than in the projection display device according to the first embodiment. Here, the term "semi-outdoors" refers to space that is not completely surrounded by walls although there is a roof, such as a courtyard, for example, and in which at least one side of the space faces the outside. FIG. 2F is an exploded plan view depicting the configuration of an LCD duct through which cooling air is delivered to an LCD unit.

Although the basic configuration of the second embodiment is similar to that of the first embodiment shown in FIG. 2E, as shown in FIG. 2F, the difference is in that B air filter 42, which is a second air filter, is not provided in the air intake passage of GB air intake duct 40. Although the ULPA filter that forms B air filter 42 has dust collection performance (performance of removing dust particles) higher than that of typical filters, it has a large ventilation resistance. Because of this, it is unnecessary to use B air filter 42 in the case of using the device in environments such as the semi-outdoors or the like where it is not necessary to take measures against tobacco smoke. Because of the absence of B air filter 42, ventilation resistance in the air intake passage of GB air intake duct 40 for the B optical path is reduced, so that it is possible to reduce the number of revolutions of B sirocco fan 51. In the first embodiment, the number of revolutions of B sirocco fan 51 was set to 4800 rpm in the case where the temperature of outside air detected by temperature sensor 38 was 25° C. In contrast to this, in the second embodiment that does not include B air filter 42, the number of revolutions of B sirocco fan 51 is set to 4200 rpm. As described above, the measure of reducing the number of revolutions of the cooling fan is effective for reducing noise; in the second embodiment, it was possible to reduce noise by about 2.5 dB as compared with the first embodiment.

By the adoption of this dustproof structure by using the air cooling system, it is possible to prevent a reduction in the brightness of projection images, and it is possible to implement a projection display device that further reduces noise.

<Third Embodiment>

The first embodiment was an exemplary projection display device installed in adverse environments in which sand dust, tobacco smoke, and the like are mixed, and the second embodiment was an exemplary projection display device that particularly needs to take measures against sand dust in the case of using the device in the semi-outdoors or the like.

The third embodiment is an exemplary projection display device in which it is only necessary to take more measures against tobacco smoke (nicotine) than against sand dust in the case of using the device in the indoors such as eating places, for example. In addition, although noise is slightly louder than in the second embodiment, it is possible to reduce noise more than the first embodiment does. In the third embodiment, it was possible to reduce noise by about 1.5 dB as compared with the first embodiment.

FIG. 2G is an exploded plan view depicting the configuration of an LCD duct through which cooling air is delivered to an LCD unit.

Although the basic configuration according to the third embodiment is similar to that of the first embodiment shown in FIG. 2E, as shown in FIG. 2Q the difference is in that G air filter 41, which is a second air filter, is not provided in the air intake passage of GB air intake duct 40. Although the HEPA filter that forms G air filter 41 has dust collection performance higher than that of typical filters, it has a large ventilation resistance. Thus, it is unnecessary to use G air filter 41 in the case of using the device in environments where it is not necessary to take measures against sand dust as in the case of using the device in the indoors such as eating places, for example. Because of the absence of G air filter 41, ventilation resistance of the air intake passage of the G optical path is reduced, so that it is possible to reduce the number of revolutions of G sirocco fan 36.

In the first embodiment, the number of revolutions of G sirocco fan 36 is set to 4400 rpm in the case where the temperature of outside air detected by temperature sensor 38 is 25° C. In contrast to this, in the third embodiment that does not include G air filter 41, the number of revolutions of G sirocco fan 36 is set to 4000 rpm. A reduction in the number of revolutions of the cooling fan is effective for a reduction in noise. In the third embodiment, it was possible to reduce noise by about 1.5 dB as compared with the first embodiment.

By the adoption of this dustproof structure by using the air cooling system, it is possible to prevent a change in the color temperature of projection images, and it is possible to implement a projection display device that further reduces noise.

<Fourth Embodiment>

FIGS. 3A to 3C show the fourth embodiment. The fourth embodiment is an exemplary projection display device that has the air intake opening at two places in the left side surface of the cabinet. FIG. 3A is a perspective view in which G air intake louver 68 is removed from the air intake opening of the cabinet and the air filters are disassembled.

In the fourth embodiment, the cabinet is formed of two structural components, bottom cabinet 61 and upper cabinet 60. The components mounted on the inside of the projection display device are fixed and supported mainly on bottom cabinet 61. Upper cabinet 60 is provided with manipulation button 62 that is manipulated by a user. On the left side surface of upper cabinet 60, inflow port 69 is provided to flow outside air into the inside of the cabinet.

On the inner side of the cabinet at this inflow port 69, a temperature sensor, described later, is provided to detect the temperature of air flowing from the outside.

Moreover, at the position on the front side of the right side surface of upper cabinet 60, RB air intake louver 65 is formed to admit outside air to R optical components and B optical components provided in the R optical path and the B optical path, respectively. In addition, in the fourth embodiment, RB air intake louver 65 is formed integrally with upper cabinet 61. However, it may be possible that an RB air intake opening is provided in the left side surface of upper cabinet 60 to deliver outside air to the R optical components and the B optical components and RB air intake louver 65 is detachably provided over this RB air intake opening.

Moreover, at the position on the rear surface side of the right side surface of upper cabinet 60, G air intake opening 77 is provided to deliver outside air to G optical components provided in the G optical path. G air intake louver 68 that admits outside air is detachably provided over this G air intake opening 77. RB air intake louver 65 and G air intake louver 68 each have a plurality of air intake ports.

Furthermore, on the rear surface of upper cabinet 60, IO terminal panel 63 and AC inlet 64 are provided. IO terminal panel 63 has signal input terminals from other electronic devices such as a PC, DVD player, or the like and signal output terminals to other external display devices. AC inlet 64 is a cable receptacle that supplies electric power from the outside to the projection display device.

Because the electrical configurations and the configuration of the optical engine are the same as the configurations of the first embodiment except for the configurations of the LCD duct and the individual sirocco fans (cooling fans) that deliver cooling air to the LCD unit, the description is omitted. FIG. 3B is a perspective view depicting the configuration of an LCD duct through which cooling air is delivered to an LCD unit, and FIG. 3C is an exploded plan view depicting the LCD duct.

To the R optical components and the B optical components in the optical engine, cooling air is delivered, which is admitted by RB sirocco fan 78 as shown in FIG. 3C through RB air intake louver 65 and RB air intake duct 72 as shown in FIGS. 3A and 3B. To the G optical components, cooling air is delivered, which is admitted by G sirocco fan 79 through G air intake louver 68 and G air intake duct 70.

In the inside of the cabinet, G air intake duct 70 is provided between G sirocco fan 79 provided in the inside of the projection display device and G air intake louver 68 as shown in FIGS. 3A and 3C. In the air intake passage of this G air intake duct 70, G air filter 66, which is a second air filter, is slidably supported and mounted.

In addition, between air filter 66 and G air intake louver 68 in G air intake duct 70, G air filter 67 is provided, which is a first air filter having mesh size coarser than that of G air filter 66. G air filter 67 is a urethane porous filter, which is an air filter with an approximately middle performance of a few tens cells per inch. G air filter 67 is retained and held on the inner side of G air intake louver 68 with a retention claw. G air intake louver 68 is mounted in such a way that a projection provided on the lower end portion is fit into a recessed part provided at G air intake opening 77.

Then, G air filter 66 is held in G air intake duct 70 by mounting G air intake louver 68 over G air intake opening 77 of upper cabinet 60. It is possible to readily change these two air filters 66 and 67 through this G air intake opening 77, or from the inside of the cabinet by removing G air intake louver 68 from G air intake opening 77 of upper cabinet 60. Because the structure of G air filter 66 is similar to the structure of G air filter 41, the description is omitted. Next, a passage of cooling air that is admitted from the outside and then delivered to the LCD unit and the structure of the passage will be described.

As shown in FIG. 3C, in the inside of LCD duct 46, R draft air duct 46r, G draft air duct 46g, and B draft air duct 46b are formed, which correspond to the R optical components, G optical components, and B optical components, respectively, and a dedicated ventilation port is provided for each of the R optical components, G optical components, and B optical components therebelow, which are provided in the LCD unit.

Air admitted from RB air intake louver 65 is guided to the air intake port of RB sirocco fan 78 through RB air filter 71 and RB air intake duct 72. Cooling air discharged from the discharge port of the RB sirocco fan is delivered to each of R draft air duct 46r and B draft air duct 46b in LCD duct 46. Then, the cooling air is passed through R draft air duct 45r and delivered to R-LCD 47, or the like, which is an R optical component, as well as passed through B draft air duct 45b and delivered to B-LCD 49 or the like, which is an R optical component.

Air admitted from G air intake louver 68 is guided to the air intake port of G sirocco fan 79 through G air filter 67, G air filter 66, and G air intake duct 70. Cooling air discharged from the discharge port of the G sirocco fan is delivered to G draft air duct 46g in LCD duct 46. Then, the cooling air is passed through G draft air duct 45g and delivered to G-LCD 48 or the like, which is a G optical component.

As described above, the cooling air delivered to LCD duct 46 flows from the individual dedicated ventilation ports toward individual LCDs 47, 48, and 49 of the LCD unit via the individual draft air ducts.

For RB air filter 71 and G air filter 67, which are first air filters, both use a urethane porous filter having a thickness of about 2 mm, and RB air filter 71 and G air filter 67 are comprised of 30 cells per inch and have an approximately moderate performance. The structure of G air filter 66, which is a second air filter, is the same as the aforementioned configuration.

Dust particles having a particle size of about 80 μm or more are first removed from air that is admitted from the outside of the cabinet through RB air filter 71 and G air filter 67. Because, the attachment of dust particles to the R optical components has a smaller effect on the reduction of brightness or on a change in the color temperature, the air having passed through RB air filter 71 is sent as it is to R draft air duct 46r, which is an R optical component. In addition, because the projection display device according to the fourth embodiment is intended for use in environments with a lot of sand dust such as the semi-outdoors, the air having passed through RB air filter 71 is also sent as it is to the B optical components.

Dust particles having a particle size of about 0.3 μm or more are further removed from air that is to be delivered to the G optical components through box-shaped G air filter 66 having a HEPA filter woven thereinside.

According to this dustproof structure by using the air cooling system, it is possible to prevent a reduction in brightness of projection images, and it is possible to implement a projection display device that further reduces noise.

<Fifth Embodiment>

The fourth embodiment was an exemplary projection display device in which it was necessary to take measures only against sand dust in the case of using the device in the semi-outdoors or the like. The fifth embodiment is an exemplary projection display device installed in adverse environments in which sand dust, tobacco smoke, and the like are mixed.

FIG. 3D is an exploded plan view depicting the configuration of an LCD duct through which cooling air is delivered to an LCD unit.

Although the basic configuration of the fifth embodiment is the same as the configuration of the fourth embodiment shown in FIG. 3C, the difference is in that RB air filter 73, which is a second air filter, is provided in the air intake passage of RB air intake duct 72 as shown in FIG. 3D. RB air filter 73 is an air filter in the double structure, which is used in the first and third embodiment shown in FIG. 2C.

Although the ULPA filter has a large ventilation resistance, it has dust collection performance higher than that of typical air filters. In the fifth embodiment, although noise is slightly increased than in the projection display device according to the fourth embodiment, it is possible to suppress an increase in noise to the minimum necessary amount.

According to this dustproof structure by the air cooling system, it is possible to prevent a reduction in brightness of projection images and a change in the color temperature, and it is possible to reduce noise caused by individual fans.

Dust particles having a particle size of about 0.15 μm or more and fume micro dust particles such as tobacco nicotine are removed from cooling air to be delivered to the R optical components and the B optical components through box-shaped RB air filter 73 in the double structure having an ULPA filter and activated carbon thereinside. More, specifically, it is desirable that for the mesh size of the pre air filter (RB air filter 71 and G air filter 67), the mesh size of RB air filter 71 be the same as that of G air filter 67 or finer, and for the mesh size of the air filter (G air filter 66 and RB air filter 73) in the air intake duct, the mesh size of G air filter 66 be the same as that of RB air filter 73 or coarser. This reason is as described in the first embodiment.

<Sixth Embodiment>

As described above, the fourth embodiment was an exemplary projection display device that only needs to take measures against sand dust in the semi-outdoors or the like, and the fifth embodiment was an exemplary projection display device installed in adverse environments in which sand dust, tobacco smoke, and the like are mixed. The sixth embodiment is an exemplary projection display device in which more measures need to be taken against tobacco smoke (nicotine) more than against sand dust, as in the case of using the device in the indoors such as eating places, for example. In terms of noise, although noise is slightly increased more than that in the projection display device according to the fourth embodiment, it is possible to reduce noise more than in the projection display device according to the fifth embodiment.

FIG. 3E is an exploded plan view depicting the configuration of an LCD duct through which cooling air is delivered to an LCD unit.

Although the basic configuration of the sixth embodiment is the same as the configuration of the fifth embodiment shown in FIG. 3D, the difference is in that G air filter 66, which is a second air filter, is not provided in the air intake passage of G air intake duct 70 as shown in FIG. 3E. Although the HEPA filter that forms G air filter 66 has dust collection performance higher than that of typical air filters, it has a large ventilation resistance. Because of this, in the case of using the device in indoor environments where it is not necessary to take measures against sand dust such as eating places, for example, it is not necessary to provide G air filter 66 for the projection display device, and the ventilation resistance of the air intake passage corresponding to the G optical path is made smaller by the omission of G air filter 66. Thus, it is possible to reduce the number of revolutions of G sirocco fan 79 in the G optical path.

According to this dustproof structure by using the air cooling system, it is possible to prevent a change in the color temperature of projection images, and it is possible to reduce noise caused by individual fans.

<Seventh to Ninth Embodiment>

In the aforementioned fourth to sixth embodiment, there was an exemplary configuration in which the air intake duct and the air intake louver for the R optical path also serve as the air intake duct and the air intake louver for the B optical path and the air intake duct and the air intake louver are shared between the R optical path and the B optical path.

In contrast to this, the seventh to ninth embodiment shown in FIGS. 4A to 4D are different from the fourth to sixth embodiment only in that the air intake duct and the air intake louver for the R optical path also serve as the air intake duct and the air intake louver for the G optical path and the air intake duct and the air intake louver are shared between the R optical path and the G optical path. Because of this, in the seventh to ninth embodiment, constituent members are designated the same reference numerals and signs that are the same as those of the constituent members in the fourth to sixth embodiment are omitted from the description for convenience, except for the air intake louver, air filter, air intake duct, and sirocco fan.

The seventh embodiment (FIGS. 4A and 4B) corresponds to the fourth embodiment (FIG. 3C). As shown in FIGS. 4A and 4B, cooling air admitted by RG sirocco fan 84 is delivered through RG air intake louver 88 and RB air intake duct 90 to the R optical components and the G optical components in the optical engine. Cooling air admitted by B sirocco fan 83 is delivered through B air intake louver 85 and B air intake duct 92 to the B optical components. RG air intake duct 90 is provided with RG air filter 86, which is a second air filter, and RG air filter 87, which is a first air filter. B air intake duct 92 is provided with B air filter 91, which is a second air filter.

Because the structure of RG air filter 86 is similar to the structure of G air filter 66, the description is omitted. Moreover, because the structures of RG air filter 87 and B air filter 91 are similar to the structures of RB air filter 71 and G air filter 67, the description is omitted. Furthermore, RG air intake louver 88 is detachably provided over RG air intake opening 89 on the cabinet.

The eighth embodiment (FIG. 4C) corresponds to the fifth embodiment (FIG. 3D). Although the basic configuration of the eighth embodiment is the same as the configuration of the seventh embodiment shown in FIG. 4B, the difference is in that B air intake duct 92 is provided with RB air filter 93, which is a second air filter, as shown in FIG. 4C. Because the structure of RB air filter 93 is similar to the structure of RB air filter 73, the description is omitted.

The ninth embodiment (FIG. 4D) corresponds to the sixth embodiment (FIG. 3E). Although the basic configuration of the ninth embodiment is similar to the configuration of the seventh embodiment shown in FIG. 4B, the difference is in that RG air intake duct 90 is not provided with RG air filter 86, which is a second air filter, as shown in FIG. 4D.

Also in any of the seventh to ninth embodiments, although the layout of the air filters in the air intake duct is the same as that in each of the fourth to sixth embodiments, the quantity of air passing through each of the individual optical paths is different. More specifically, in the case of comparing the seventh embodiment with the fourth embodiment, the quantity of air that passes through the optical paths is smaller than in the fourth embodiment, thereby making it possible to reduce noise slightly in the seventh embodiment. Similarly, in the case of comparing the eighth embodiment with the fifth embodiment, the quantity of air that passes through the optical paths is smaller than in the fifth embodiment, thereby making it possible to reduce noise slightly in the eighth embodiment. Similarly, in the case of comparing the ninth embodiment with the sixth embodiment, the quantity of air that passes through the optical paths is smaller than in the sixth embodiment, thereby making it possible to reduce noise slightly in the ninth embodiment.

<Tenth Embodiment>

FIG. 5A shows the tenth embodiment, illustrating an exploded plan view depicting the configuration of an LCD duct through which cooling air is delivered to an LCD unit. In the configuration the same as that of the first embodiment, the tenth embodiment includes filter detection sensor 100 for the G air filter and filter detection sensor 101 for the B air filter as a filter detecting means for detecting the states of the presence or absence of the attachment of G air filter 41 and B air filter 42. For filter detection sensors 100 and 101, a push-fit detection switch is used.

In the tenth embodiment, it is possible to control the numbers of revolutions of cooling fans (sirocco fans) according to the mounting state of individual air filters 41 and 42 using filter detection sensor 100 for the G air filter and filter detection sensor 101 for the B air filter. Accordingly, this embodiment implements a low noise projection display device with no occurrence of shortage of cooling individual LCDs 47, 48, and 49.

Figure 5C:
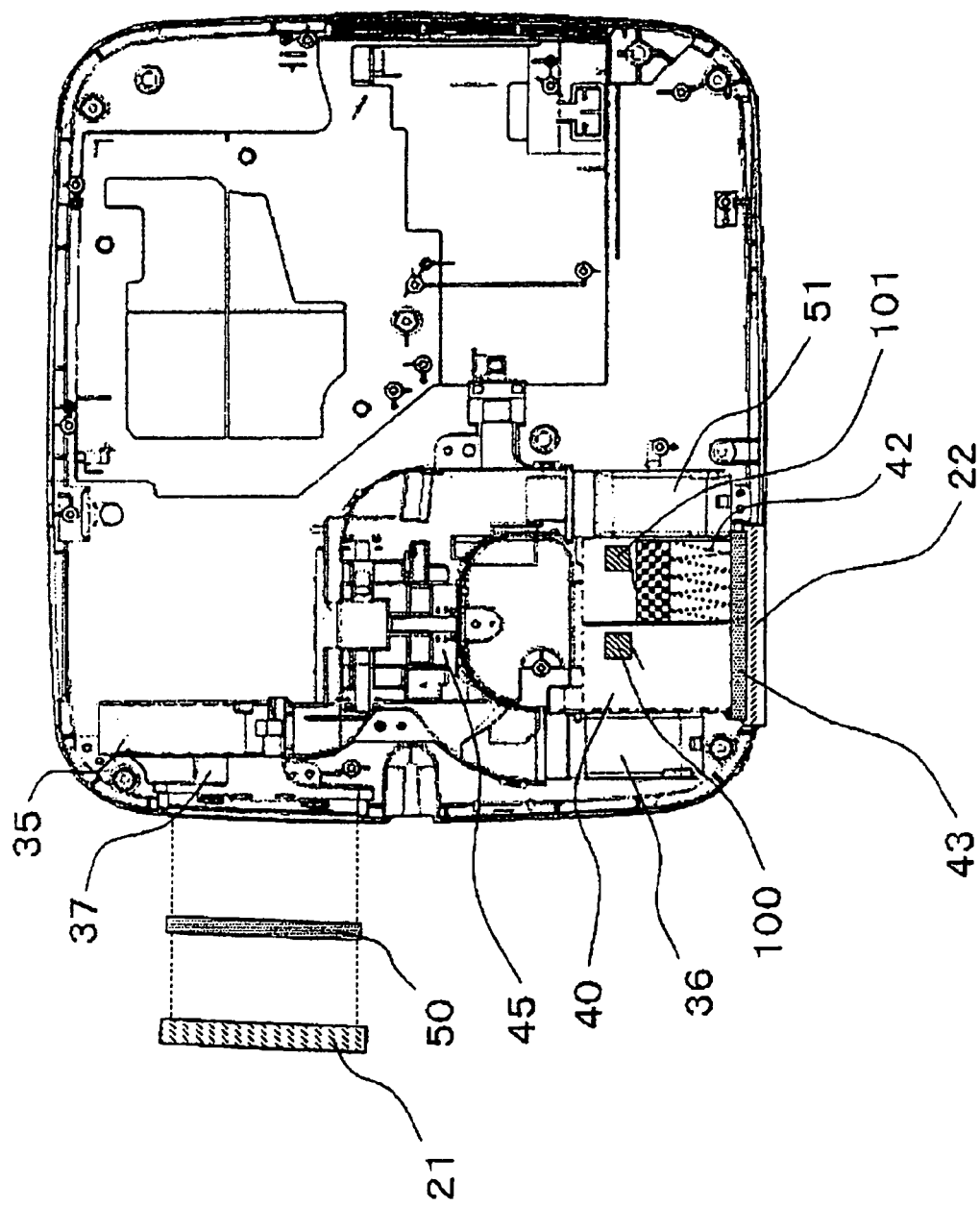
FIG. 5C is an exploded plan view depicting the state in which the projection display device according to the tenth embodiment is attached with only a B air filter.
Figure 5D:
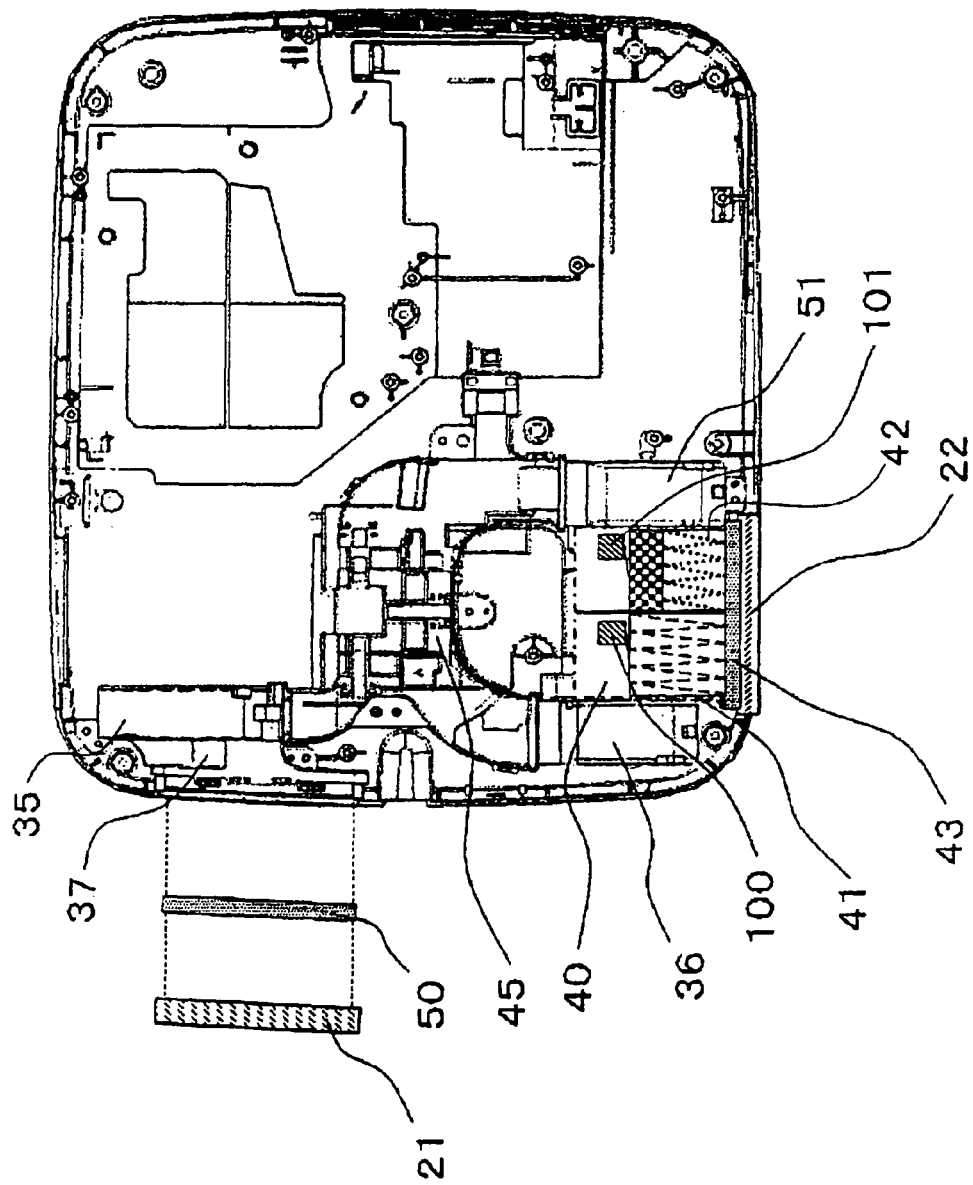
FIG. 5D is an exploded plan view depicting the state in which the projection display device according to the tenth embodiment is attached with the G air filter and the B air filter.

FIG. 5B shows the case where only G air filter 41 is mounted in GB air intake duct 40, and FIG. 5C shows in the case where only B air filter 42 is mounted in GB air intake duct 40. FIG. 5D shows the case where both of G air filter 41 and B air filter 42 are mounted in GB air intake duct 40.

TABLE 1

| Temperature of Outside Air (° C.) | Number of Revolutions of Cooling Fan in R Optical Path (rpm) | Number of Revolutions of Cooling Fan in G Optical Path (rpm) Detected Result of G Air Filer | | Number of Revolutions of Cooling Fan in B Optical Path (rpm) Detected Result of B Air Filer | | Number of Revolutions of Lamp Fan (rpm) | Number of Revolutions of Exhaust Fan (rpm) |
|---|---|---|---|---|---|---|---|
| | | Presence | Absence | Presence | Absence | | |
| 5 | 3200 | 4000 | 4400 | 4200 | 4800 | 4200 | 2500 |
| . | . | . | . | . | . | . | . |
| . | . | . | . | . | . | . | . |
| . | . | . | . | . | . | . | . |
| 25 | 3200 | 4000 | 4400 | 4200 | 4800 | 4500 | 2500 |
| 26 | 3450 | 4355 | 4755 | 4550 | 5150 | 4515 | 2600 |
| 27 | 3700 | 4710 | 5110 | 4900 | 5500 | 4530 | 2700 |
| 28 | 3950 | 5065 | 5465 | 5250 | 5850 | 4545 | 2800 |
| 29 | 4200 | 5420 | 5820 | 5600 | 6200 | 4560 | 2900 |
| 30 | 4450 | 5775 | 6175 | 5950 | 6550 | 4575 | 3000 |
| 31 | 4700 | 6130 | 6530 | 6300 | 6900 | 4590 | 3100 |
| 32 | 4950 | 6485 | 6885 | 6650 | 7250 | 4605 | 3200 |
| 33 | 5200 | 6840 | 7240 | 7000 | 7600 | 4620 | 3300 |
| 34 | 5450 | 7195 | 7595 | 7350 | 7950 | 4635 | 3400 |
| 35 | 5700 | 7550 | 7950 | 7700 | 8300 | 4650 | 3500 |

Table 1 shows the temperature of outside air detected by temperature sensor 38 and the numbers of revolutions of the individual cooling fans corresponding to the states of the presence or absence of the attachment of individual air filters 41 and 42 detected by filter detection sensors 100 and 101.

Figure 6:
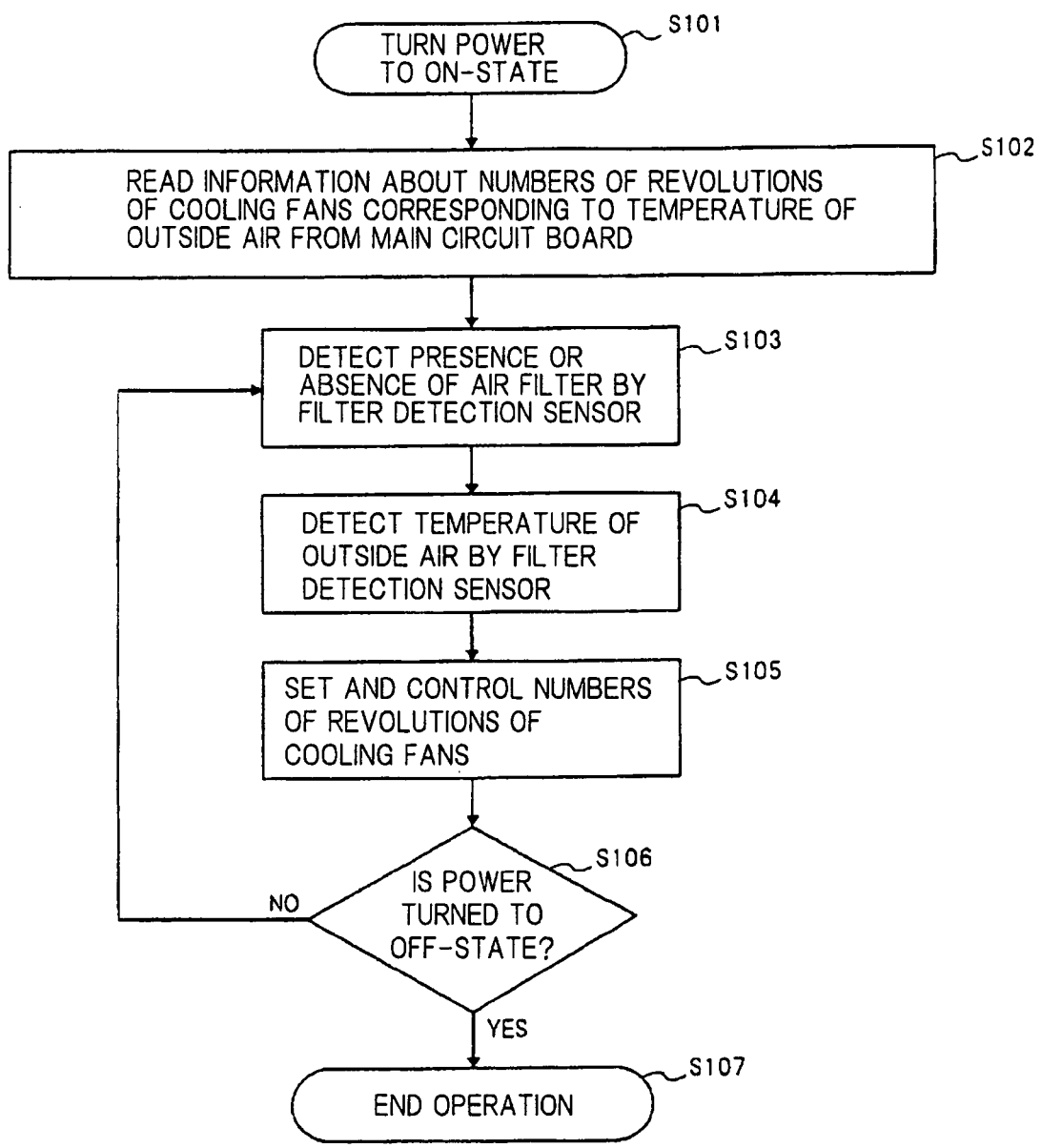
FIG. 6 is a flow chart illustrative of the operation that controls the numbers of revolutions of cooling fans in the projection display device according to the tenth embodiment.

FIG. 6 is a flow chart depicting the operation that controls the numbers of revolutions of the cooling fans in the projection display device.

As shown in FIG. 6, in the projection display device, the power supply is turned to the ON-state in Step S101, and then information about the number of revolutions of each of the individual fans corresponding to the temperature of outside air as shown in table 1 is read from non-volatile memory 27 on main circuit board 31 in control circuit unit 28 as shown in Step S102. Subsequently, as shown in Step S103, the states of the presence or absence of the attachment of individual air filters 41 and 42 are detected by filter detection sensors 100 and 101, and then the temperature of outside air is detected by temperature sensor 38 as shown in Step S104. Subsequently, based on the detected result of the states of the presence or absence of the attachment of individual air filters 41 and 42 and the detected result of the temperature of outside air, control circuit unit 28 sets and controls the numbers of revolutions of the individual cooling fans as shown in Step S105.

Lastly, as shown in Step S106, whether the power supply of the projection display device is in the OFF-state is detected. In the case where the power supply of the projection display device is not in the OFF-state, the process again returns to Step S103 in which the states of the presence or absence of the attachment of individual air filters 41 and 42 are detected by detection sensors 100 and 101. In the case where the power supply is in the OFF-state, the process goes to the finish operation of the projection display device as shown in Step S107.

According to this process sequence, when any one of air filters 41 and 42 is detached from or attached in GB air intake duct 40 during the operation in which the projection display device is projecting images, it is possible to automatically change the numbers of revolutions of the cooling fans, and it is possible to deal with a change in the temperature of outside air at the same time.

Here, as shown in FIG. 5B, the operation of the projection display device will be described in the case where B air filter 42 is not mounted in GB air intake duct 40 and only G air filter 41 is mounted therein with reference to Table 1 and FIG. 6.

After the power supply of the projection display device is turned to the ON-state, information about the numbers of revolutions of the cooling fans corresponding to the temperature of outside air is first read from non-volatile memory 27 on main circuit board 31 in control circuit unit 28, as shown in Table 1. Subsequently, the states of the presence or absence of the attachment of air filters 41 and 42 are detected by filter detection sensors 100 and 101 for detecting that G air filter 41 is present in GB air intake duct 40. Subsequently, temperature sensor 38 detects that the temperature of outside air is at a temperature of 25° C., for example.

Consequently, at this time, G air filter 41 is mounted as the air filter, and the temperature of outside air is at a temperature of 25° C. Because of this, the number of revolutions of each of the individual fans is set as follows: G sirocco fan 36 (the cooling fan in the G optical path in Table 1) is set to 4400 rpm; B sirocco fan 51 (the cooling fan in the B optical path in Table 1) to 4200 rpm; R sirocco fan 35 to 3200 rpm; the light source fan to 4500 rpm; and exhaust fan 34 to 2500 rpm. Control circuit unit 28 controls each fan so as to keep this number of revolutions. Subsequently, in the case where the power supply of the projection display device is not in the OFF-state after ten seconds has elapsed, the states of the presence or absence of the attachment of air filters 41 and 42 are again detected by filter detection sensors 100 and 101, and the temperature of outside air is detected by temperature sensor 38.

By a series of these operations, it is possible to automatically set the numbers of revolutions of the cooling fans optimum to the mounting states of individual air filters 41 and 42, and it is possible to optimize the cooling of the LCD unit and optimize noise that is to be suppressed.

In addition, according to the projection display device of this embodiment, it is possible to automatically set the numbers of revolutions of the cooling fans, which are the cooling conditions necessary to correctly cool the LCD unit when a user attaches suitable air filters 41 and 42 in GB air intake duct 40 depending on installation environments, and it is possible to suppress noise caused by the cooling fans to the minimum necessary amount. As a result, it is possible to improve the reliability of the operation of the projection display device, it is possible to implement a reduction in the overall size and weight of the device, and it is possible to implement a dustproof, environmentally adaptive projection display device at low noise.

Because the present invention is the dustproof structure of an image generation device by the air cooling system, the present invention is not limited to LCDs as image generation devices, which is adaptive to display devices that use other image generation devices such as DMD, for example.

Hereinabove, the present invention is described with reference to the embodiments. However, the present invention is not limited to the aforementioned embodiments. The configurations and details of the present invention may be variously modified and altered in a manner that a person skilled in the art may appreciate them within the scope of the present invention.

The invention claimed is:

1. A dustproof structure of an image generation device, the structure comprising:
    image generation devices, one each corresponding to red, green, and blue;
    an air duct for red, an air duct for green, and an air duct for blue provided, so as to individually blow cooling air to said image generation devices;
    a first air filter provided for each of said air duct for red, said air duct for green, and said air duct for blue; and
    a second air filter provided for at least one air duct of said air duct for green and said air duct for blue, the second air filter having a filter mesh size smaller than that of said first air filter,
    wherein, in a configuration in which said second air filter is provided in both of said air duct for green and said air duct for blue, said second air filter that is provided in said air duct for blue has a filter mesh size smaller than that of said second air filter that is provided in said air duct for green.

2. The dustproof structure of an image generation device according to claim 1, wherein:
    said second air filter provided in said air duct for green is configured by folding a HEPA filter; and
    said second air filter provided in said air duct for blue is configured of a portion that is formed by folding an ULPA filter and a portion filled with activated carbon, the portions being provided along a ventilation direction of said cooling air.

3. The dustproof structure of an image generation device according to claim 1,
    wherein said second air filter is slidably supported and mounted in at least one of the air duct for red, the air duct for green, and the air duct for blue.

4. The dustproof structure of an image generation device according to claim 1, wherein an inside of said second air filter that is provided in said air duct for blue includes a first portion configured of folded nonwoven fabric and a second portion in which activated carbon is filled in a bag-shaped nonwoven fabric, wherein the first portion and the second portion are disposed along a ventilation direction.

5. The dustproof structure of an image generation device according to claim 1, wherein an inside of said second air filter that is provided in said air duct for blue includes a first portion having a first structure and a second portion having a second structure, wherein the first portion and the second portion are disposed along a ventilation direction.

6. The dustproof structure of an image generation device according to claim 1, wherein an inside of said second air filter that is provided in said air duct for blue includes a first portion having a first structure and a second portion having a second structure, wherein the first portion and the second portion have a filter mesh size smaller than that of said second air filter that is provided in said air duct for green.

7. The dustproof structure of an image generation device according to claim 1, wherein said second air filter is provided in only both of said air duct for green and said air duct for blue.

* * * * *